US011197345B2

United States Patent
Oyman et al.

(10) Patent No.: US 11,197,345 B2
(45) Date of Patent: *Dec. 7, 2021

(54) APPARATUSES FOR END-TO-END COORDINATION OF VOICE OVER CELLULAR DATA NETWORK COMMUNICATIONS

(71) Applicant: Intel Corporation, Santa Clara, CA (US)

(72) Inventors: Ozgur Oyman, Palo Alto, CA (US); Thomas Luetzenkirchen, Taufkirchen (DE); Jerome Parron, Fuerth (DE); Fabrice Plante, Hillsboro, OR (US); Marta Martinez Tarradell, Hillsboro, OR (US); Sudhir Shankar Pola, Bangalore (IN); Usharani Ayyalasomayajula, Bangalore (IN); Ganesh Vijayan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,228

(22) Filed: Aug. 28, 2018

(65) Prior Publication Data
US 2019/0045578 A1    Feb. 7, 2019

Related U.S. Application Data

(60) Provisional application No. 62/582,847, filed on Nov. 7, 2017, provisional application No. 62/581,543, filed
(Continued)

(51) Int. Cl.
*H04W 80/12* (2009.01)
*H04L 29/06* (2006.01)
(Continued)

(52) U.S. Cl.
CPC ......... *H04W 80/12* (2013.01); *H04L 43/0852* (2013.01); *H04L 65/1006* (2013.01);
(Continued)

(58) Field of Classification Search
None
See application file for complete search history.

(56) References Cited

U.S. PATENT DOCUMENTS 7,289,451 B2 * 10/2007 Bruhn .................. H04L 5/14
370/252
2011/0187926 A1 * 8/2011 Kim ..................... H04N 7/00
348/497
(Continued)

OTHER PUBLICATIONS

3GPP TR 23.759, "3rd Generation Partnership Project; Technical Specification Group Services and System Aspects; Study for enhanced VoLTE Performance (Release 15)", V0.5.0, Jun. 2017, 14 pages.
(Continued)

*Primary Examiner* — Saba Tsegaye
(74) *Attorney, Agent, or Firm* — Alliance IP, LLC

(57) ABSTRACT

Apparatuses of user equipment (UEs) for end-to-end coordination of voice over cellular data network communications. An apparatus of a UE includes one or more data storage devices and one or more processors. The one or more data storage devices are configured to store delay budget information pertaining to end-to-end delivery of a real-time transport protocol (RTP) stream sent from a remote UE to the UE. The one or more processors are configured to generate an application layer message including the delay budget information, the application layer message to be transmitted to the remote UE to enable the remote UE to request, from a cellular base station servicing the remote UE, additional air interface delay based on the delay budget information.

14 Claims, 18 Drawing Sheets

Related U.S. Application Data on Nov. 3, 2017, provisional application No. 62/569,348, filed on Oct. 6, 2017, provisional application No. 62/555,541, filed on Sep. 7, 2017.

(51) Int. Cl.

| | | |
|---|---|---|
| *H04M 7/00* | (2006.01) | |
| *H04L 12/26* | (2006.01) | |
| *H04W 80/10* | (2009.01) | |
| *H04W 28/04* | (2009.01) | |
| *H04W 28/02* | (2009.01) | |
| *H04W 36/00* | (2009.01) | |
| *H04W 84/04* | (2009.01) | |

(52) U.S. Cl.
CPC .......... *H04L 65/607* (2013.01); *H04L 65/608* (2013.01); *H04L 65/80* (2013.01); *H04M 7/0063* (2013.01); *H04W 28/0268* (2013.01); *H04W 28/04* (2013.01); *H04W 36/0022* (2013.01); *H04W 80/10* (2013.01); *H04W 84/045* (2013.01)

(56) References Cited

U.S. PATENT DOCUMENTS

| | | | | |
|---|---|---|---|---|
| 2015/0373774 A1* | 12/2015 | Belghoul | ............ | H04L 43/0858 370/252 |
| 2017/0099118 A1* | 4/2017 | Negalaguli | ........... | H04L 1/0026 |
| 2017/0187593 A1* | 6/2017 | Balasubramanian | ........................ | H04L 67/2804 |
| 2018/0352092 A1* | 12/2018 | Rajendran | ........... | H04M 7/0072 |
| 2019/0288953 A1* | 9/2019 | Yavuz | ................. | H04L 43/0858 |

OTHER PUBLICATIONS

3GPP TS 26.114, "3rd Generation Partnership Project; Technical Specification Group Services and System Aspects; IP Multimedia Subsystem (IMS); Multimedia Telephony; Media handling and interaction (Release 14)", V14.4.0, Jun. 2017, 392 pages.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 14)", V14.3.0, Jun. 2017, 745 pages.

U.S. Appl. No. 16/406,333, Non-Final Office Action, dated Nov. 29, 2019, 13 pages.

Ott, J. et al., "Extended RTP Profile for Real-Time Transport Control Protocol (RTCP)-Based Feedback (RTP/AVPF)," The Internet Society (2006) (51 pages).

USPTO Non-Final Office Action in U.S. Appl. No. 16/403,333 dated Apr. 15, 2020.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          ULPLR          |             zero padding            |
+-+-+-+-+-+-+-+-+-+-+-+-+-+-+-+-+-+-+-+-+-+-+-+-+-+-+-+-+-+-+-+-+
          /                                             /
        1260                                          1270
```
1200

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       UL_DL_PLR_Ratio       |           zero padding          |
+-+-+-+-+-+-+-+-+-+-+-+-+-+-+-+-+-+-+-+-+-+-+-+-+-+-+-+-+-+-+-+-+
          /                                             /
        1360                                          1370
```
1300

FIG. 13

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  ID   | len=7 |       ULPLR          |       zero_padding    |
+-+-+-+-+-+-+-+-+-+-+-+-+-+-+-+-+-+-+-+-+-+-+-+-+-+-+-+-+-+-+-+-+
    /       /       \                               /
  1462    1464     1460                           1470
```
1400

FIG. 14

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  ID   | len=7 |   UL_DL_PLR_Ratio   |       zero_padding     |
+-+-+-+-+-+-+-+-+-+-+-+-+-+-+-+-+-+-+-+-+-+-+-+-+-+-+-+-+-+-+-+-+
  /        /        /                             /
1562     1564     1560                          1570
```
1500

FIG. 15

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  ID   | len=7 |   UL_DL_PLR_Ratio1  |  UL_DL_PLR_Ratio2      |
+-+-+-+-+-+-+-+-+-+-+-+-+-+-+-+-+-+-+-+-+-+-+-+-+-+-+-+-+-+-+-+-+
  /        /        /                             /
1662     1664     1660A                         1660B
```
1600

FIG. 16

APPARATUSES FOR END-TO-END COORDINATION OF VOICE OVER CELLULAR DATA NETWORK COMMUNICATIONS

RELATED APPLICATIONS

This application claims priority to U.S. Provisional Patent Application No. 62/555,541, filed Sep. 7, 2017; U.S. Provisional Patent Application No. 62/569,348, filed Oct. 6, 2017; U.S. Provisional Patent Application No. 62/581,543, filed Nov. 3, 2017; and U.S. Provisional Patent Application No. 62/582,847, filed Nov. 7, 2017, the entire disclosures of all of which are hereby incorporated herein by reference.

BACKGROUND

Various embodiments generally may relate to the field of wireless communications.

BRIEF DESCRIPTION OF THE DRAWINGS

FIG. 12 is a simplified illustration of an example FCI format of an RTCP feedback message, according to some embodiments.

FIG. 13 is a simplified illustration of an example FCI format of an RTCP feedback message, according to some embodiments.

FIG. 14 is a simplified illustration of a format of an example RTP header extension message, according to some embodiments.

FIG. 15 is a simplified illustration of a format of an example RTP header extension message, according to some embodiments.

FIG. 16 is a simplified illustration of a format of an example RTP header extension message, according to some embodiments.

DETAILED DESCRIPTION OF PREFERRED EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Release (Rel)-14 Work addressing Radio Access Network (RAN)-Level Delay Budget Reporting The radio access network 2 (RAN2)-led Release 14 (Rel-14) work item "Voice and Video Enhancement for [Long Term Evolution] [(LTE)]" (LTE_VoLTE_ViLTE_enh) specified several voice over long term evolution (LTE) and video over LTE (VoLTE/ViLTE) enhancement features including radio access network (RAN) assisted codec adaptation, VoLTE/ViLTE signalling optimization and VoLTE/ViLTE quality/coverage enhancement. In SA4, Rel-14 item "RAN-Assisted Codec Adaptation in MTSI" (LTE_VoLTE_ViLTE_enh-S4) was completed as a building block of the LTE_VoLTE_ViLTE_enh feature to specify media handling aspects of RAN-assisted codec adaptation functionality in Third Generation Partnership Project (3GPP) technical specification (TS) 26.114.

In addition to RAN-assisted codec adaptation, another important feature specified by RAN2 as part of the LTE_VoLTE_ViLTE_enh feature is Voice over LTE (VoLTE) quality/coverage enhancement functionality. As part of this functionality, RAN2 specifies a delay budget reporting framework so that the VoLTE coverage can be effectively enhanced by relaxing the air interface delay budget. The UE uses radio resource control (RRC) signalling to report the delay budget information. Based on the reported delay budget information, when a user equipment (UE) is in good coverage, a cellular base station (e.g., an evolved NodeB, or "eNB") can configure longer Discontinuous Reception (DRX) for power saving purposes or the eNB can reduce DRX cycle in order to help the remote UE and reduce end-to-end delay and jitter, since when the remote UE is in bad coverage, the local eNB of that remote UE can increase the retransmission times in order to reduce the packet loss.

Use Case for RAN Delay Budget Reporting

Figure 1:
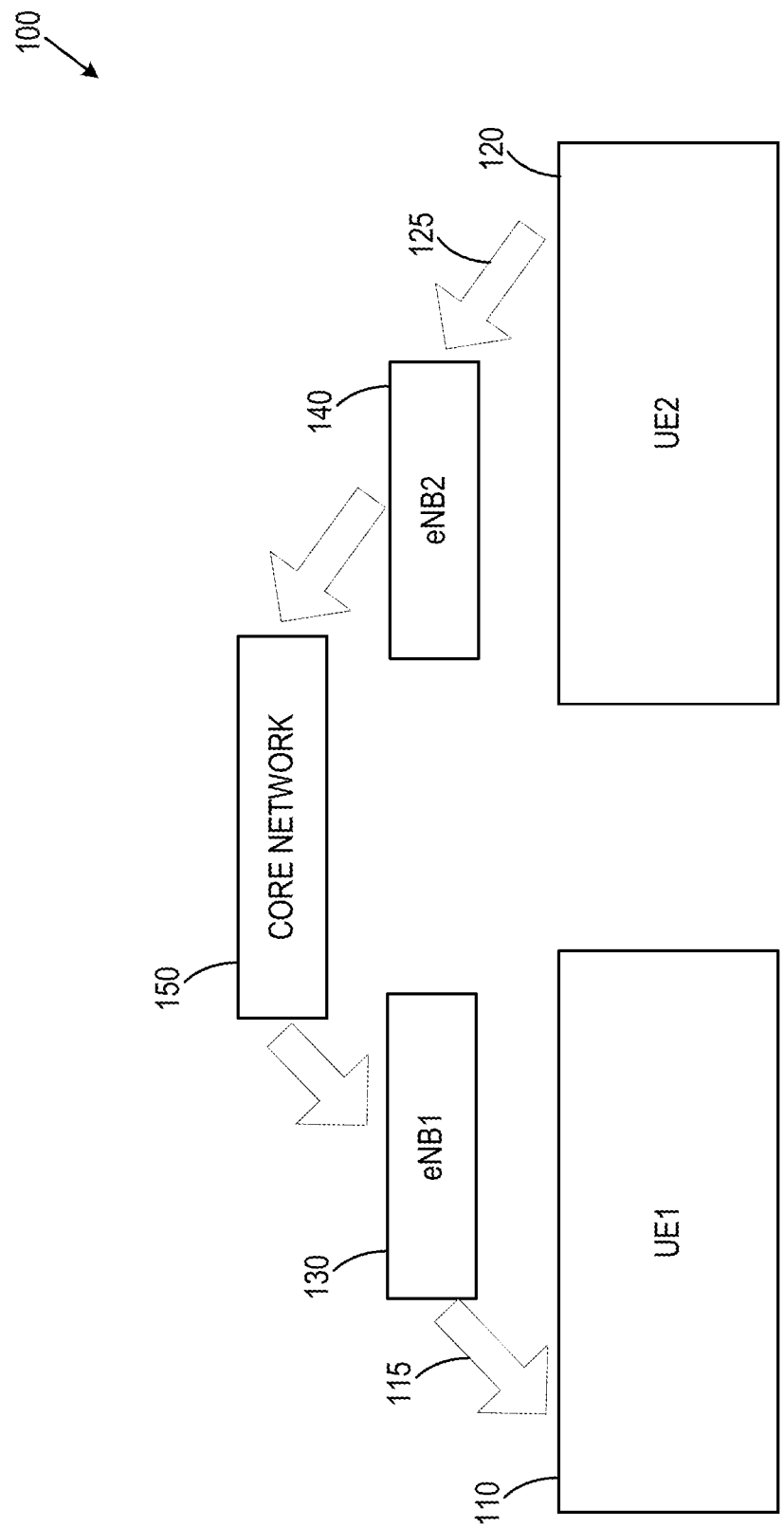
FIG. 1 is a simplified block diagram of a wireless commmunication system illustrating a first UE shortening a connected mode DRX (CDRX) for a degraded VoLTE call.

FIG. 1 is a simplified block diagram of a wireless communication system 100 illustrating a first UE 110 shortening a connected mode DRX (CDRX) for a degraded VoLTE call. The wireless communication system 100 includes the first UE 110 (sometimes referred to herein as "UE1" 110), a second UE 120 (sometimes referred to herein as "UE2" 120), a first eNB 130 (sometimes referred to herein as "eNB1" 130), a second eNB 140 (sometimes referred to herein as "eNB2" 140), and a core network 150. The first eNB 130 is configured to service the first UE 110, and the second eNB 140 is configured to service the second UE 120.

In one example operational scenario, a wireless communication link 115 between UE1 110 and eNB1 130 may be in a relatively good radio condition and therefore originally configured by eNB1 130 with 40 milliseconds (ms) CDRX. In contrast, a wireless communication link 125 between UE2 120 and eNB2 140 may be in a relatively poor radio condition and therefore originally configured by eNB2 140 with no CDRX. This example operational scenario may result in the following operations:

UE2 120 detects the poor radio condition of the wireless communication link 125 (e.g., high block error ratio (BLER)). As a result, UE2 120 may perform many hybrid automatic repeat request (HARQ) retransmissions, which causes long jitter and end-to-end delay at the receiver UE1 110.

UE1 110 detects that the VoLTE quality is poor (e.g., large jitter or delay). As a result, UE1 110 suggests to eNB1 130 to de-configure CDRX or shorten CDRX cycle. As a result, the end-to-end delay and jitter are reduced.

UE2 120 detects that the VoLTE end-to-end delay has dropped. As a result, UE2 120 reports a larger delay headroom to eNB2 140, so eNB2 140 may apply more enhanced machine-type-communications (eMTC) repetitions (or more HARQ retransmissions), which may result in increased jitter or delay. This lack of coordination between UE1 110 and UE2 120 may thus create a tug of war between the UE1 110 and the UE2 120.

One solution is to configure UE1 110 to indicate to eNB1 130 a CDRX cycle value that is different from the configured CDRX cycle value. UE1 110 indicates a preferred CDRX cycle length via a new RRC message. The eNB1 130 decides which CDRX cycle to use. A prohibit timer is configured by eNB1 130 to prevent UE1 110 from sending the indication too frequently.

Signaling Solution in 3GPP TS 36.331 on RAN Delay Budget Reporting

In order to realize the solution above, RAN2 has adopted the following RRC signaling in TS 36.331 based on the UEAssistanceInformation message with the semantics shown in Table 1 below, which allows UE1 110 to signal to eNB1 130 delay budget reporting information as follows:

A UE in good coverage indicates a preference to the eNB to reduce the local air interface delay by sending a UEAssistanceInformation message with delayBudgetReport value and indication of type1 to decrease the connected mode DRX cycle length, so that the E2E delay and jitter can be reduced.

The peer UE in bad coverage can send a UEAssistanceInformation message with delayBudgetReport value and indication of type 2 to its eNB to indicate a preference on Uu air interface delay adjustments When the UE detects changes such as end-to-end multimedia telephony service for Internet Protocol (IP) multimedia core network subsystem (IMS) (MTSI) voice quality or local radio quality, the UE may inform the eNB its new preference by sending a UEAssistanceInformation message with updated contents on delayBudgetReport.

TABLE 1

Semantics of the UEAssistanceInformation message for RAN delay budget reporting
UEAssistanceInformation field descriptions delayBudgetReport Indicates the UE-preferred adjustment to connected mode DRX or coverage enhancement configuration.
type1

Indicates the preferred amount of increment/decrement to the connected mode DRX cycle length with respect to the current configuration. Value in number of milliseconds. Value ms40 corresponds to 40 milliseconds, msMinus40 corresponds to −40 milliseconds and so on.
type2

Indicates the preferred amount of increment/decrement to the coverage enhancement configuration with respect to the current configuration so that the Uu air interface delay changes by the indicated amount. Value in number of milliseconds. Value ms24 corresponds to 24 milliseconds, msMinus24 corresponds to −24 milliseconds and so on.

Application Layer Signaling of Delay Budget Information

While RAN-layer delay budget reporting allows UEs to locally adjust air interface delay, such a mechanism does not provide coordination between the UEs to manage delay and jitter on an end-to-end basis. To alleviate this problem, the following real-time transport protocol/real-time transport control protocol (RTP/RTCP) signaling may be defined to signal delay budget information between UEs.

A new RTCP feedback (FB) message type to carry available additional delay budget information during the RTP streaming of media (signalled from the MTSI receiver to the MTSI sender);

A new Session Description Protocol (SDP) parameter on the RTCP-based ability to signal available additional delay budget information during the IMS/session information protocol (SIP) based capability negotiations;

A new RTP header extension type to carry query signal for available additional delay budget information during the RTP streaming of media (signalled from the MTSI sender to the MTSI receiver);

A new SDP parameter on the RTP-based ability to signal RAN-level bitrate recommendation info during the IMS/SIP-based capability negotiations.

RTCP feedback messages signalled from the MTSI receiver to the MTSI sender may also carry available delay budget information for the reverse link (i.e., for the sent RTP stream). In this case, the use of RTP header extension messages may not be necessary.

RTP header extension messages signalled from the MTSI sender to the MTSI receiver may also carry available delay budget information for the reverse link (i.e., for the received RTP stream). In this case, the use of RTCP feedback messages may not be necessary.

The signaling of available additional delay budget information may use RTCP feedback messages as specified in Internet Engineering Task Force (IETF) 4585. As such, the RTCP feedback message is sent from the MTSI receiver to the MTSI sender to convey to the sender about the available additional delay budget information from the perspective of the receiver. The recipient UE (MTSI sender) of the RTCP feedback message may then use this information in determining how much delay budget it may request from its eNB over the RAN interface, e.g. by using RRC signalling based on UEAssistanceInformation.

The RTCP feedback message is identified by payload type (PT)=PSFB (206), where PSFB refers to a payload-specific feedback message. Feedback message type (FMT) shall be set to the value "Y" for available additional delay budget information. The RTCP feedback method may involve signaling of available additional delay budget information in both of the immediate feedback and early RTCP modes.

Feedback control information (FCI) format can be as follows. In some embodiments, the FCI 200 can contain exactly one instance of the available additional delay budget information, including one or more of the following parameters (available additional delay parameter is mandatory, but others are optional and may not be present):
Available additional delay parameter (e.g., specified in milliseconds using, for example, 16 bits)
Sign "s" for the additional delay parameter, and whether this is positive or negative (e.g., specified as a Boolean (1 bit) (optional parameter))
Query "q" for additional delay budget (e.g., specified as a Boolean (1 bit) (optional parameter))

The sign of the available additional delay parameter may be positive or negative (e.g., as indicated by sign "s"). In some embodiments, when the available additional delay parameter takes a positive value, the UE indicates that there is additional delay available. In case the additional delay parameter takes a negative value, the UE indicates that the delay budget has been reduced. As such, a sequence of RTCP feedback messages may be sent by the UE to report on the additional delay budget availability in increments.

The query "q" is to request information regarding additional delay budget for the reverse link (for which the originator of the RTCP feedback message is the voice sender). This is an alternative to the RTP header extension signalling method described below. When the MTSI receiver sends RTCP feedback messages addressing the available delay budget for the received RTP stream, the query parameter is not to be included or is to be set to '0'. When query parameter is included and set to '1', the purpose of the RTCP feedback message is to ask for additional delay budget for the reverse link (i.e., for the sent RTP stream). This is an alternate to the RTP header extension signalling method described below. This signalling option, however, relies on the presence of a bi-directional link (i.e., it would not work in case of send-only or receive-only streams). When the query bit is set to '1', the delay budget value delay may be interpreted as the additional delay budget requested by the sender of the RTCP feedback message (i.e., MTSI receiver) for the reverse link (i.e., sent RTP stream).

It should be noted that this FCI format is for illustration purposes, and other formats can also be defined to convey available additional delay budget information.

Figure 2:
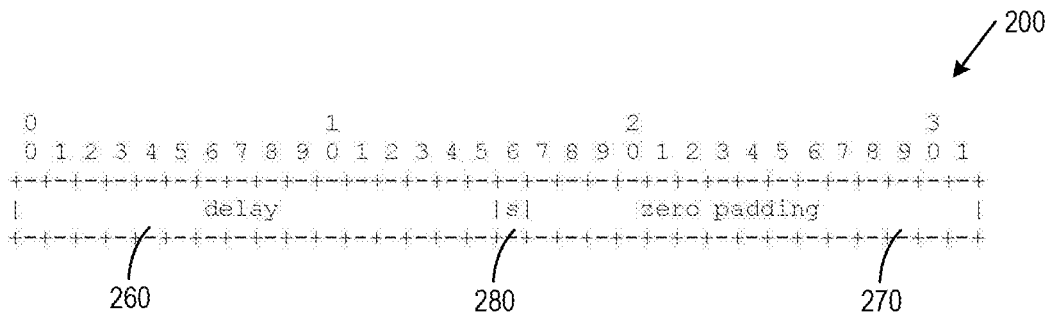
FIG. 2 is a simplified illustration of an example FCI format of an RTCP feedback message, according to some embodiments.

FIG. 2 is a simplified illustration of an example FCI format of an RTCP feedback message 200 (sometimes referred to as "RTCP-FB" 200), according to some embodiments. The FCI of the RTCP feedback message 200 includes an available additional delay parameter 260, a sign "s" 280 (i.e., the single-bit message indicating the sign of the available additional delay parameter), and zero padding 270. The RTCP feedback message 200 does not include the query signal "q."

In the example illustrated by FIG. 2 the high byte should be followed by the low byte, where the low byte holds the least significant bits.

Figure 3:
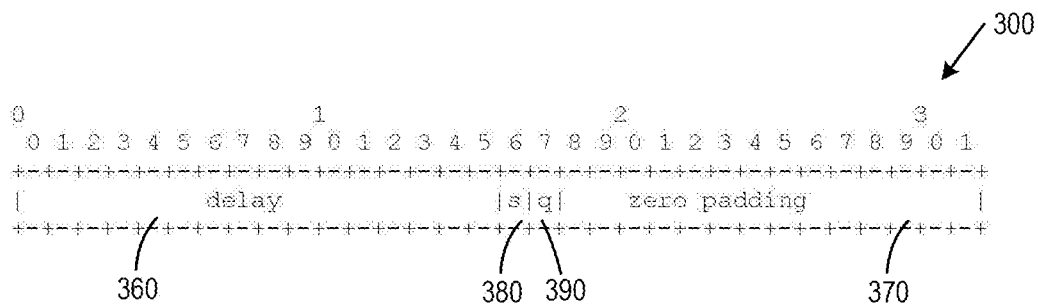
FIG. 3 is a simplified illustration of an example FCI format of an RTCP feedback message, according to some embodiments.

FIG. 3 is a simplified illustration of an example FCI format of an RTCP feedback message 300, according to some embodiments. The FCI of the RTCP feedback message 300 includes an available additional delay parameter 360, a sign "s" 380, and zero padding 370, similar to the additional delay parameter 260, the sign "s" 280, and the zero padding 270 of FIG. 2. The FCI format of the RTCP feedback message 300, however, includes a query signal "q" 390 ("q" stands for the single-bit message on query).

A 3GPP MTSI client (based on TS 26.114) supporting this RTCP feedback message 300 can offer such capability in the SDP for all media streams containing video and/or audio. The offer can be made by including an a=RTCP feedback (a=rtcp-fb) attribute in conjunction with the following parameter: 3gpp-delay-budget. A wildcard payload type ("*") may be used to indicate that the RTCP feedback attribute applies to all payload types. An example usage of this attribute is as follows:
a=rtcp-fb:*3gpp-delay-budget
An augmented ABNF for rtcp-fb-val corresponding to the feedback type "3gpp-delay-budget" can be given as follows:
rtcp-fb-val=/"3gpp-delay-budget"
The term "ABNF" may refer to an Augmented Backus-Naur Form, which is a meta-language with its own formal syntax and rules based on the Backus-Naur Form and is used to define message exchanges in a bi-directional communications protocol.

Figure 4:
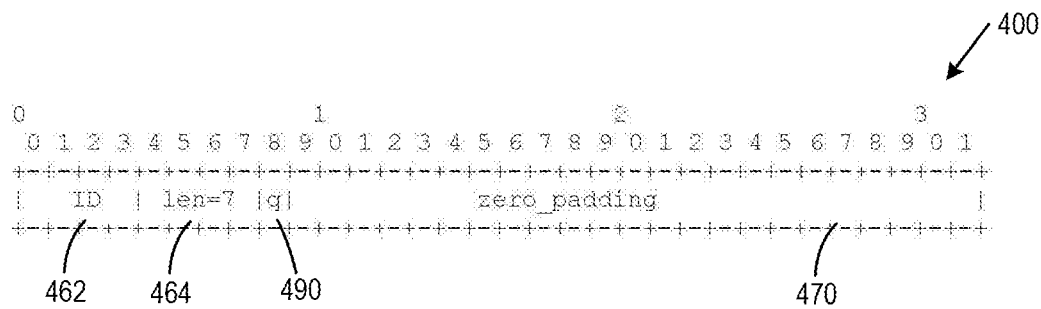
FIG. 4 is a simplified illustration of a format of an example RTP header extension message, according to some embodiments.

FIG. 4 is a simplified illustration of a format of an example RTP header extension message 400, according to some embodiments. In some settings, the query for available additional delay budget information may be signaled by the MTSI sender as part of the transmitted RTP stream using the RTP header extension message. As illustrated in FIG. 4, the example RTP header extension message 400 includes an ID 462, a len=7 464, a query "q" 490, and zero padding 470.

Figure 5:
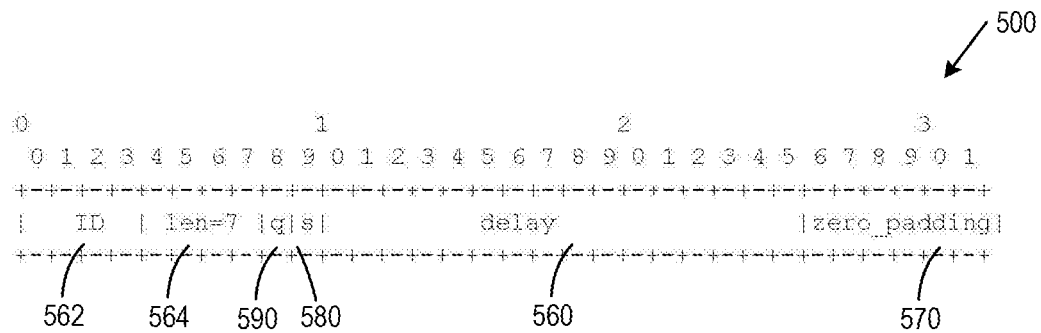
FIG. 5 is a simplified illustration of a format of an example RTP header extension message, according to some embodiments.

FIG. 5 is a simplified illustration of a format of an example RTP header extension message 500, according to some embodiments. In the example format shown in FIG. 5 the query from the MTSI sender may also contain the additional delay budget requested. The example RTP header extension message 500 includes an ID 562, a len=7 564, a query "q" 590, an available additional delay parameter delay 560, a sign "s" 580 of the available additional delay parameter delay 560, and zero padding 570. Similarly as discussed above with reference to FIG. 2, the requested additional delay budget delay 560 may be specified in milliseconds (16 bits), and the sign "s" 580 is for the additional delay budget delay 560 and whether this is positive or negative may be specified as a Boolean (1 bit) (optional parameter)

When the MTSI sender signals RTP header extension messages addressing the requested delay budget for the sent RTP stream, the query parameter is always to be included and set to '1'. When query parameter is not included or set to '0', the purpose of the RTP header extension message is to indicate the available additional delay budget for the reverse link (i.e., for the received RTP stream). This is an alternate to the RTCP feedback message signalling method described above. This signalling option, however, relies on the presence of a bi-directional link (i.e., it would not work in case of send-only or receive-only streams). When the query bit is omitted or set to '0', the delay budget value delay may be interpreted as the available additional delay budget indicated by the MTSI sender for the reverse link (i.e., received RTP stream).

A 3GPP MTSI client (based on TS 26.114) supporting this RTP header extension message can offer such capability in the SDP for all media streams containing video/audio. This capability can be offered by including the a=extmap attribute indicating a dedicated uniform resource name (URN) under the relevant media line scope. The URN corresponding to the capability to signal query for available additional delay budget information is: urn:3gpp:delay-budget-query. An example of usage of this URN in the SDP is as follows:

a=extmap:7 urn:3gpp:delay-budget-query

The number 7 (len=7) in the examples of FIGS. 4 and 5 may be replaced with any number in the range 1-14.

Example End-to-End Signaling Flows

Figure 6:
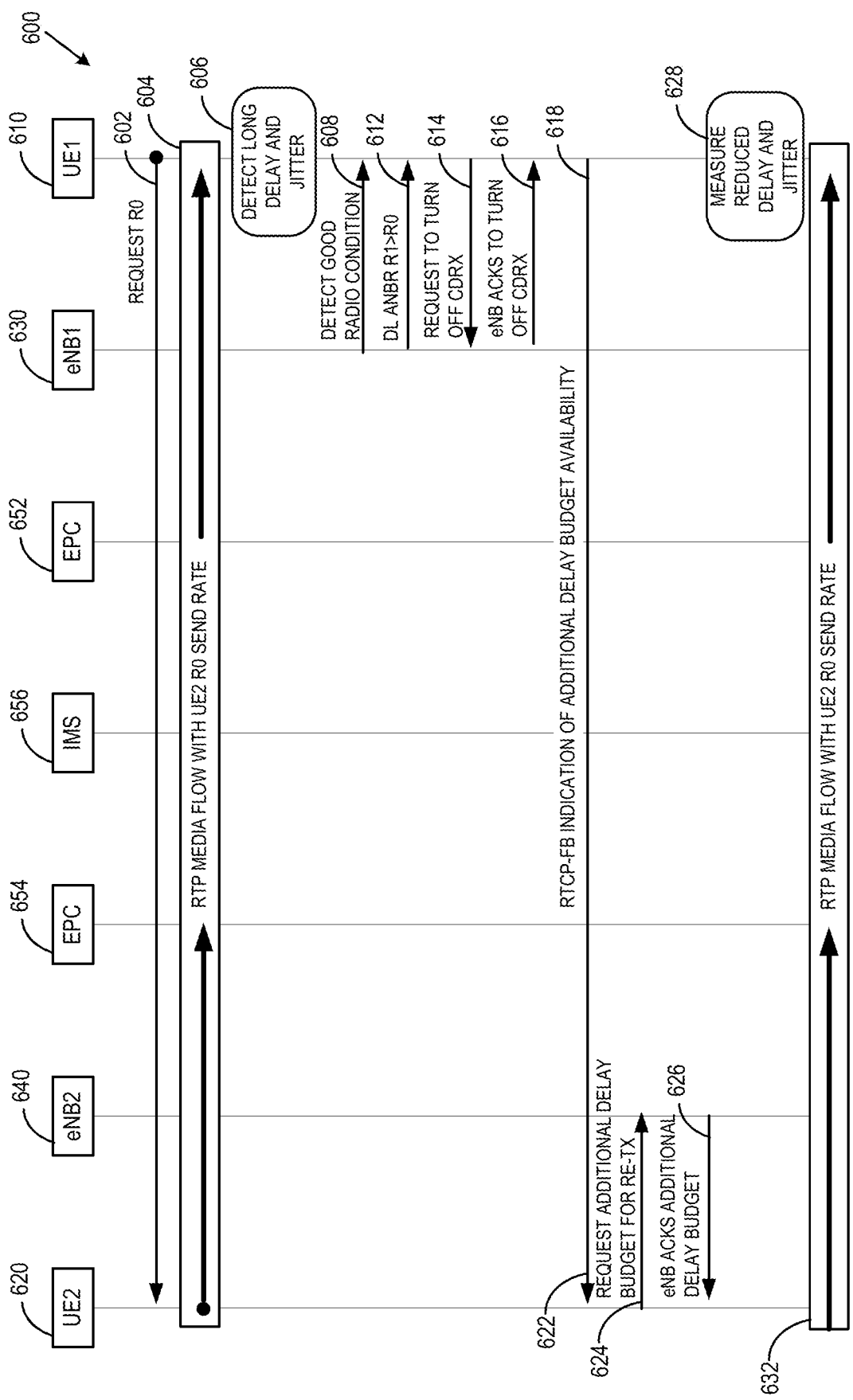
FIG. 6 is a simplified end-to-end signal flow diagram of an example procedure for an example scenario, according to some embodiments.
Figure 7:
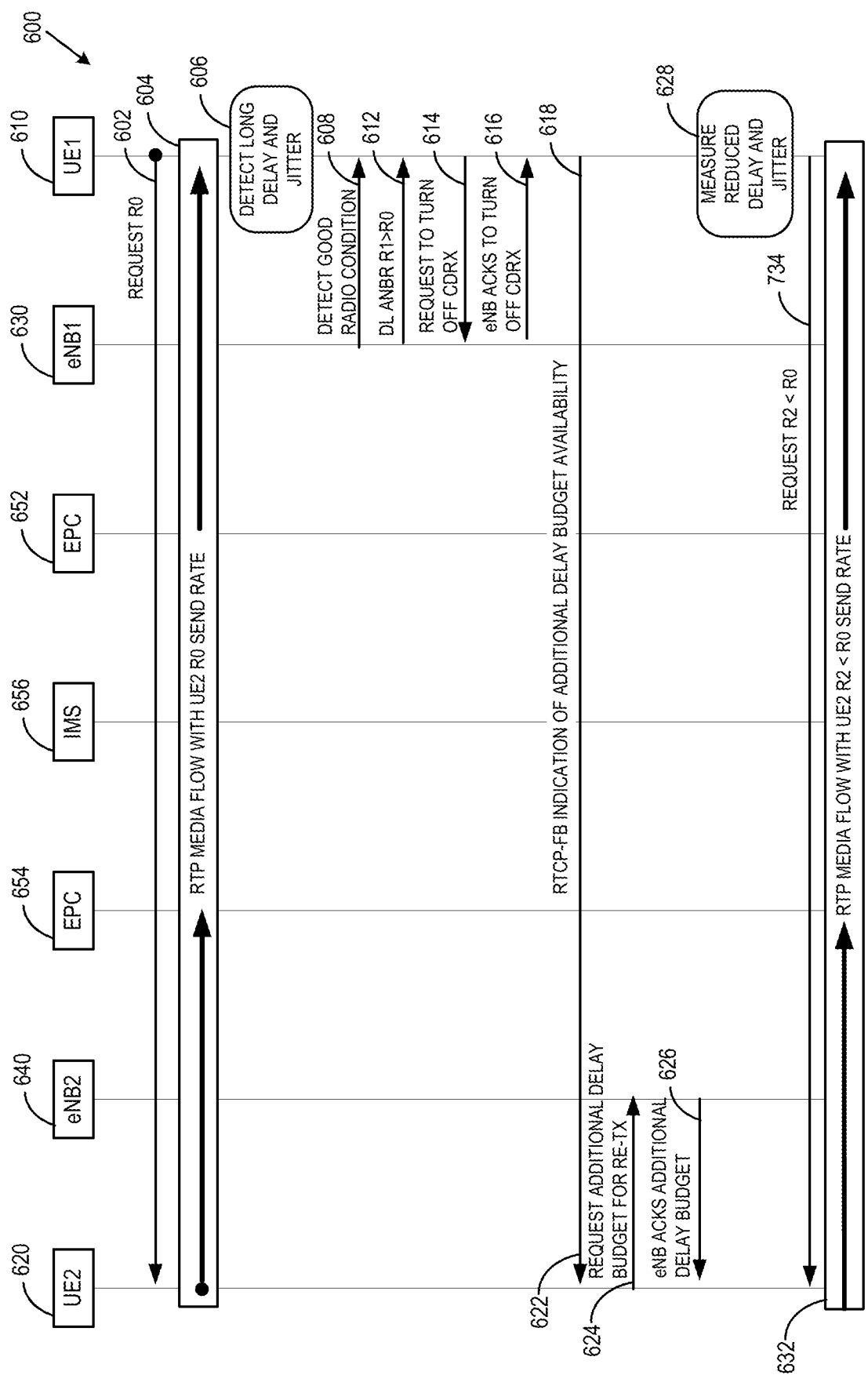
FIG. 7 is a simplified end-to-end signal flow diagram of an example procedure, according to some embodiments.
Figure 8:
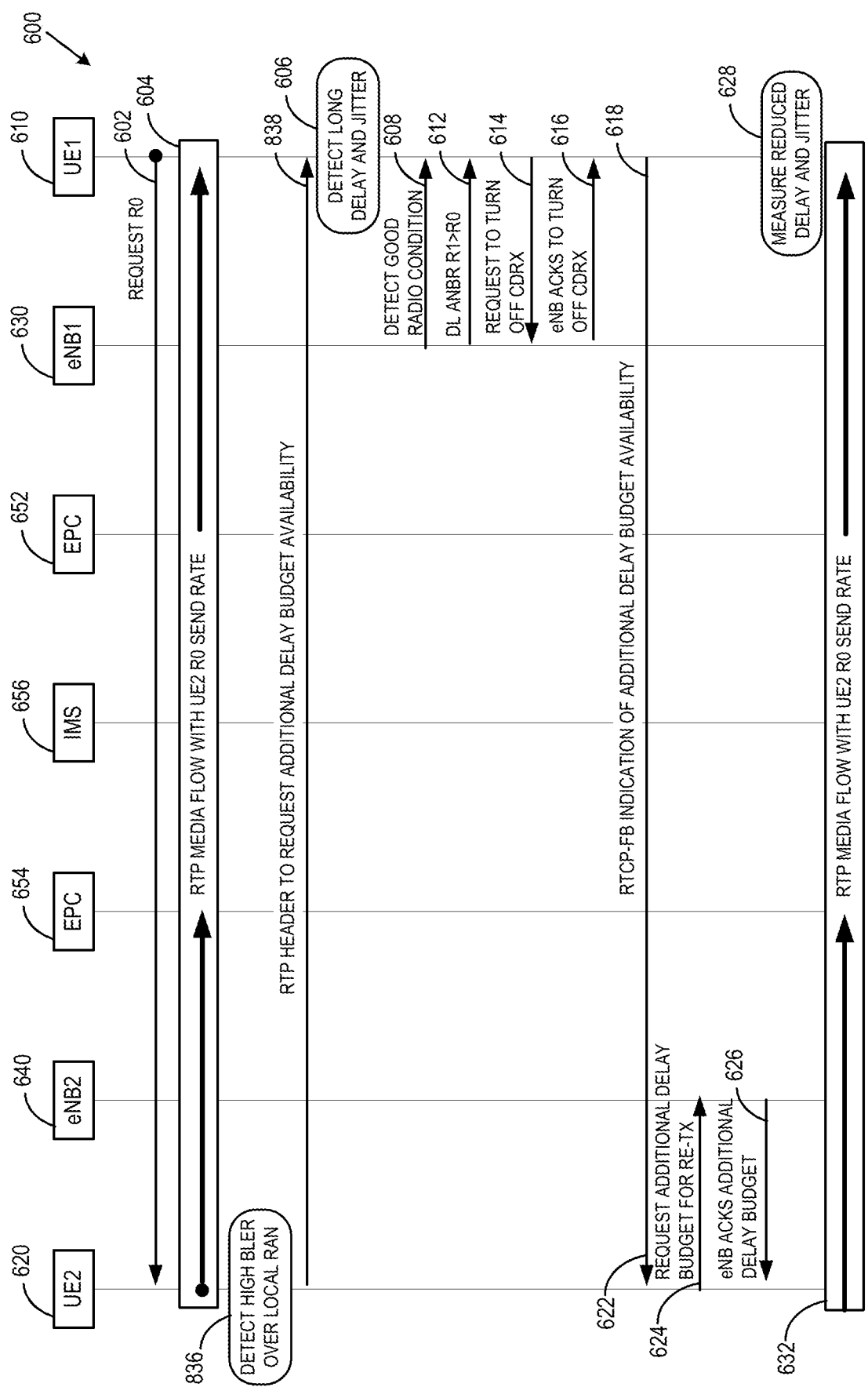
FIG. 8 is a simplified end-to-end signal flow diagram of an example procedure, according to some embodiments.

FIGS. 6-8 illustrate signal flow diagrams of example procedures in example scenarios that fall within the scope of the disclosure. Each of FIGS. 6-8 includes a request message 602. The request message 602 of FIGS. 6-8 is a generalized application level rate request message that corresponds to codec mode request (CMR) or RTCP-APP (application) for voice.

FIG. 6 is a simplified end-to-end signal flow diagram of an example procedure for an example scenario, according to some embodiments. The procedure of FIG. 6 describes end-to-end RAN delay budget reporting usage for voice in a wireless communication system 600. The wireless communication system 600 includes a first UE 610 (sometimes referred to herein as "UE1" 610), a second UE 620 (sometimes referred to herein as "UE2" 620), a first eNB 630 (sometimes referred to herein as "eNB1" 630), a second eNB 640 (sometimes referred to herein as "eNB2" 640), a first evolved packet core (EPC) 652, a second EPC 654, and an IMS 656. For purposes of FIG. 6, the first eNB 630 is servicing the first UE 610 and the second eNB 640 is servicing the second UE 620.

In operation, UE1 610 sends, to UE2 620, a request message 602 including a rate request via CMR or RTCP-APP for voice at bitrate R0. UE2 620 sends, to UE1 610, an RTP media flow 604 for voice with bitrate R0. UE1 610 detects 606 that there is long end-to-end delay and jitter by, for example, detecting high packet losses despite applying the highest possible jitter buffer (subject to the jitter buffer management (JBM) compliance requirement of MTSI) and/or by monitoring RTCP sender and receiver reports). In the meantime, UE1 610 detects 608 good radio conditions locally, e.g., eNB1 630 sends a downlink (DL) access network bitrate recommendation (ANBR) 612 of bitrate R1>R0 to UE1 610, and UE1 610 measures low block error rate (BLER) over the local radio link between UE1 610 and eNB1 630. Hence, UE1 610 concludes that UE2's local radio conditions are poor. UE1 610 sends a UEAssistanceInformation message to eNB1 630 with type-1 to request 614 that eNB1 630 turn off CDRX. The first eNB 630 grants this request 614 and turns off CDRX for UE1 610, and transmits an acknowledgment 616 to UE1 610 acknowledging that CDRX is turned off.

UE1 610 sends an RTCP-FB message 618 to UE2 620 indicating the availability of additional delay budget availability. A concrete delay number may be reported by the RTCP-FB message 618 that also may be determined considering JBM constraints of UE1 610 and can be based on an assessment by UE1 610 of how much additional delay UE1 610 can tolerate. UE1 610 may send a sequence of RTCP-FB messages 618 in this fashion to incrementally report about the additional delay budget availability. In some embodiments, the reported delay number in some RTCP-FB messages 618 may be negative if UE1 610 cannot tolerate further delay or wishes to reduce the delay. UE2 620 requests 624 additional delay budget from eNB2 640 in order to perform additional re-transmissions to increase the reliability of its uplink (UL) transmissions. The second eNB 640 grants and acknowledges 626 this request 624. UE1 610 measures 628 reduced end-to-end delay and jitter, and packet losses are also reduced. UE2 620 sends, to UE1 610, an RTP media flow 632 for voice with bitrate R0.

In the example of FIG. 6 the available delay budget may be computed by UE1 610 (MTSI receiver) based on network delay, jitter, packet loss rate (PLR) and potentially other parameters. It may also take into account a constraint on the way jitter buffer management (JBM) is performed. In this respect, the following should be noted regarding the expected UE behavior:

Allowing UE2 620 to use more retransmission will likely increase the jitter. This potentially causes more packets to be dropped at the JBM for UE1 610.

On the other hand, more retransmission also allows UE2 620 to reduce packet losses in its RAN and this means more end-to-end reliability. So a fine balance between increased jitter and more retransmission should be struck here.

It is up to UE1 610 to grant any additional delay budget. If UE1 610 thinks that it is already close to its JBM constraint and cannot tolerate any additional delay (as this would lead to more packets being dropped), it would not signal additional delay availability to UE2 620 (e.g., in the RTCP-FB message 622).

Once UE2 620 goes into good coverage, the packet losses seen by UE1 610 will be reduced and UE2 620 will also no longer need the additional delay budget. In this case, either UE1 610 would reduce the available delay budget or UE2 620 would request that its delay budget be reduced; both types of signaling are possible within the scope of the disclosure (e.g., via indication of negative delay values in the RTCP-FB message 618). It should also be noted that UE1 610 is not the asker but the grantor in this framework, and it is UE2 620 that requests any changes. UE1 610 would grant or disapprove requests from UE2 620.

FIG. 7 is a simplified end-to-end signal flow diagram of an example procedure, according to some embodiments. FIG. 7 is the same as FIG. 6 with the addition that UE1 610 transmits a rate request 734 to UE2 620. For example, in the situation where UE1 610 still suffers from high packet loss and measures high end-to-end delay and jitter, UE1 610 sends, to UE2 620, the rate request 734 via CMR or RTCP-APP for voice at bitrate R2<R0. Other kinds of adaptations may also be invoked. For example, application layer redundancy may be used in case the receiver side detects major packet loss but delay and jitter are within desired bounds.

FIG. 8 is a simplified end-to-end signal flow diagram of an example procedure, according to some embodiments. The example procedure depicted by FIG. 8 is a variant of the procedure of FIG. 6. FIG. 8 is the same as FIG. 6 except where UE2 620 requests additional delay budget from UE1 610 during the media flow (e.g., using an RTP header message 838) after having detected 836 poor radio conditions (e.g., high BLER) over the local RAN. The presence of this request message 838 may further inform UE1 610 that the radio conditions on the side of UE2 620 are poor (in addition to its own detection based on end-to-end delay and jitter measurements).

EXAMPLES A

The following is a non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, the list of examples of Examples B below, and the above and below disclosed embodiments, are not combinable, it is contemplated within the scope of the disclosure that such examples and embodiments are combinable.

Example 1 may include local user equipment (UE) operable to perform multimedia telephony with a remote UE, the local UE having one or more processors configured to: communicate, from the local UE to the remote UE, the available additional delay budget information via a real-time transport control protocol (RTCP) feedback message, where the available additional delay budget pertains to end-to-end delivery of the RTP stream from the remote UE to the local UE. Based on the signaled additional delay information, the remote UE requests from its local eNB additional air interface delay to improve its transmissions.

Example 2 may include the local UE of Example 1 or some other example herein, wherein prior to sending the RTCP feedback message containing the additional delay budget information, the local UE receives a query message from the remote UE in an RTP header extension message containing additional delay budget request information.

Example 3 may include the local UE of Example 1 or some other example herein, wherein the one or more processors are further configured to receive a session description protocol (SDP) offer message from the remote UE that includes an RTCP feedback attribute that is associated with a Third Generation Partnership Project (3GPP) 3gpp-delay-budget parameter, thereby indicating that the remote UE supports the reception of available delay budget information signaled via RTCP feedback messages.

Example 4 may include the local UE of Example 1 or some other example herein, wherein the one or more processors are further configured to send a session description protocol (SDP) answer message to the remote UE that includes an RTCP feedback attribute that is associated with a Third Generation Partnership Project (3GPP) 3gpp-delay-budget parameter, thereby acknowledging that the local UE supports the transmission of available delay budget information signaled via RTCP feedback messages.

Example 5 may include the local UE of Example 2 or some other example herein, wherein the one or more processors are further configured to receive a session description protocol (SDP) offer message from the remote UE that includes an extension map attribute that is associated with a Third Generation Partnership Project (3GPP) delay-budget-query parameter, thereby indicating that the remote UE supports query with additional delay budget request information signaled via RTP header extension messages.

Example 6 may include the local UE of Example 2 or some other example herein, wherein the one or more processors are further configured to send a session description protocol (SDP) answer message to the remote UE that includes an extension map attribute that is associated with a Third Generation Partnership Project (3GPP) delay-budget-query parameter, thereby acknowledging that the local UE supports query with additional delay budget request information signaled via RTP header extension messages.

Example 7 may include the local UE of Example 1 or some other example herein, wherein the RTCP feedback message communicated from the local UE to the remote UE includes a descriptor that contains additional delay budget information with the following values: relative additional delay value, sign of the delay parameter (positive or negative), query parameter for the delay over the reverse link.

Example 8 may include the local UE of Example 2 or some other example herein, wherein the RTP header extension received from the remote UE includes a descriptor that contains the requested additional delay budget information with the following query values: the requested additional delay value, sign of the delay parameter (positive or negative).

Example 9 may include the local UE of Example 1 or some other example herein, wherein the additional delay budget information is determined based on an assessment of how much additional delay the UE can tolerate based on end-to-end monitoring of network delay, Jitter, packet loss rate (PLR), as well as consideration of the constraints of the jitter buffer management in the UE.

Example 10 may include the local UE of Example 1 or some other example herein, wherein the local UE detects high end-to-end packet loss, delay and/or jitter while also detects good radio conditions locally (e.g., by detecting low block error rate (BLER) in its RAN and/or receiving a high enough bitrate recommendation from its RAN) and sends a request to its local eNB to reduce air interface delay, e.g., by turning off cRDX.

Example 11 may include the local UE of Example 9 or some other example herein, wherein the additional available delay budget signaled by the local UE to the remote UE using RTCP feedback messages contains the relative additional delay value that corresponds to the air interface delay reduction achieved (e.g., through turning off cDRX) after the communication with the eNB.

Example 12 may include the local UE of Example 1 or some other example herein, wherein the air interface delay increase requested by the remote UE from its eNB corresponds to the additional delay budget signaled from the local UE to the remote UE using the RTCP feedback message.

Example 13: An apparatus of a user equipment (UE), comprising: one or more data storage devices to store delay budget information pertaining to end-to-end delivery of a real-time transport protocol (RTP) stream sent from a remote UE to the UE; and one or more processors to generate an application layer message including the delay budget information, the application layer message to be transmitted to the remote UE to enable the remote UE to request, from a cellular base station servicing the remote UE, additional air interface delay based on the delay budget information.

Example 14: The apparatus of Example 13, wherein the application layer message comprises a real-time transport control protocol (RTCP) feedback message including the delay budget information.

Example 15: The apparatus of Example 14, wherein the application layer message is configured to indicate a relative additional delay value, a sign of the relative additional delay value, and a Boolean query parameter, which, if set to positive, allows requesting delay for a reverse RTP stream sent from the UE to the remote UE, the sign of the relative additional delay value indicating whether the relative additional delay value should be added to the delay budget or whether the delay budget should be reduced by the relative additional delay value.

Example 16: The apparatus of Example 13, wherein the application layer message comprises an RTP header extension message including the delay budget information, which is sent as part of a reverse RTP stream from the UE to the remote UE.

Example 17: The apparatus of Example 16, wherein the application layer message is configured to indicate a relative additional delay value, a sign of the relative additional delay value, and a Boolean query parameter, the Boolean query parameter being set to positive to enable requesting delay for a reverse RTP stream sent from the UE to the remote UE, the sign of the relative additional delay value indicating whether the relative additional delay value should be added to the delay budget or whether the delay budget should be reduced by the relative additional delay value.

Example 18: The apparatus according to any one of Examples 13-17, wherein the one or more processors are configured to decode a query message received from the remote UE before transmission of the application layer message to the remote UE, the query message including additional delay budget request information requesting the delay budget information from the UE.

Example 19: The apparatus of Example 18, wherein the one or more processors are further configured to decode a session description protocol (SDP) answer message received from the remote UE, the SDP answer message including an extension map attribute that is associated with a standardized delay budget query parameter, the standardized delay budget query parameter configured to indicate that the remote UE supports query with the additional delay budget request information signaled via application layer messages.

Example 20: The apparatus according to any one of Examples 18 and 19, wherein the one or more processors are further configured to generate a session description protocol (SDP) answer message to be transmitted to the remote UE, the SDP answer message including an extension map attribute that is associated with a standardized delay budget query parameter configured to acknowledge that the UE supports query with the additional delay budget request information signaled via application layer messages.

Example 21: The apparatus according to any one of Examples 18-20, wherein the query message received from the remote UE includes a requested additional delay value and a sign of the additional delay value, the sign of the additional delay value indicating whether the additional delay value should be added to the delay budget or whether the delay budget should be reduced by the additional delay value.

Example 22: The apparatus according to any one of Example 13-21, wherein the one or more processors are further configured to decode a session description protocol (SDP) offer message received from the remote UE, the SDP offer message configured to indicate that the remote UE supports reception of the delay budget information via application layer messages.

Example 23: The apparatus according to any one of Examples 13-22, wherein the one or more processors are further configured to generate a session description protocol (SDP) answer message to be transmitted to the remote UE, the SDP answer message configured to indicate that the UE supports transmission of the delay budget information via application layer messages.

Example 24: The apparatus according to any one of Examples 13-23, wherein the one or more processors are further configured to determine the delay budget information based on an assessment of how much additional delay the UE can tolerate based on end-to-end monitoring of network delay, jitter, packet loss ratio (PLR), and constraints for a jitter buffer manager of the UE.

Example 25: The apparatus according to any one of Examples 13-24, wherein the one or more processors are further configured to generate, responsive to detections of high end-to-end packet loss and good local radio conditions between the UE and a cellular base station servicing the UE, a request message to be transmitted to the eNB servicing the UE, the request message configured to request that the cellular base station servicing the UE reduce the air interface delay.

Example 26: The apparatus of Example 25, wherein the delay budget information of the application layer message includes a relative additional delay value configured to indicate an air interface delay reduction achieved responsive to the cellular base station servicing the UE reducing the air interface delay.

Example 27: The apparatus according to any one of Examples 13-26, wherein the additional air interface delay requested by the remote UE is equal to an additional delay budget signaled from the UE to the remote UE using the application layer message.

Example 28: An apparatus of a user equipment (UE), comprising: one or more data storage devices to store delay budget information pertaining to end-to-end delivery of a real-time transport protocol (RTP) stream sent from a remote UE to the UE; and one or more processors to generate a real-time transport control protocol (RTCP) feedback message to transmit to the remote UE, the RTCP feedback message including the delay budget information, the RTCP feedback message to be transmitted to the remote UE to enable the remote UE to request, from a cellular base station servicing the remote UE, additional air interface delay based on the delay budget information.

Example 29: The apparatus of Example 28, wherein the one or more processors are further configured to decode a query message received in an RTP header extension message in the RTP stream sent from the remote UE before transmission of the RTCP feedback message to the remote UE, the query message including additional delay budget request information requesting the delay budget information from the UE.

Example 30: An apparatus of a user equipment (UE), comprising: one or more data storage devices to store delay budget information pertaining to end-to-end delivery of a real-time transport protocol (RTP) stream from a remote UE to the UE; and one or more processors to generate an RTP header extension message including the delay budget information, the RTP header extension message to be transmitted to the remote UE to enable the remote UE as part of a reverse RTP stream sent to the remote UE to request, from a cellular base station servicing the remote UE, additional air interface delay based on the delay budget information.

Example 31: The apparatus of Example 30, wherein the RTP header extension message is configured to indicate a relative additional delay value, a sign of the relative additional delay value, and a Boolean query parameter, which, if set to positive allows requesting delay for a reverse RTP stream sent from the UE to the remote UE, the sign of the relative additional delay value indicating whether the relative additional delay value should be added to the delay budget or whether the delay budget should be reduced by the relative additional delay value.

Example 32 may include an apparatus comprising means to perform one or more elements of a method described in or related to any of Examples 1-31, or any other method or process described herein.

Example 33 may include one or more non-transitory computer-readable media comprising instructions to cause an electronic device, upon execution of the instructions by one or more processors of the electronic device, to perform one or more elements of a method described in or related to any of Examples 1-31, or any other method or process described herein.

Example 34 may include an apparatus comprising logic, modules, or circuitry to perform one or more elements of a method described in or related to any of Examples 1-31, or any other method or process described herein.

Example 35 may include a method, technique, or process as described in or related to any of Examples 1-31, or portions or parts thereof.

Example 36 may include an apparatus comprising: one or more processors and one or more computer readable media comprising instructions that, when executed by the one or more processors, cause the one or more processors to perform the method, techniques, or process as described in or related to any of Examples 1-31, or portions thereof.

Example 37 may include a signal as described in or related to any of Examples 1-31, or portions or parts thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Maximum Packet Loss Ratio Information Signaling for Single Radio Voice Call Continuity (SRVCC) Handover Optimization Embodiments herein may enable application-layer mechanisms to signal maximum packet loss ratio (Max PLR) information toward enabling Single Radio Voice Call Continuity (SRVCC) handover optimization for Voice over Long Term Evolution (VoLTE) calls. Embodiments may take into account the impact of proprietary client implementations of Packet-Loss Concealment (PLC) and Jitter Buffer Management (JBM) on having different Max PLR and potential mechanisms to indicate this to the network.

In addition to the negotiated codecs and codec modes, the end-to-end quality and robustness of the VoLTE connection also depend on UE capabilities including, for example, JBM and PLC. In the meantime, a Max PLR parameter is derived by Policy and Charging Rules Function (PCRF) (e.g., in the network-based architecture) or the UE and signaled to the cellular base station (e.g., eNB). This Max PLR parameter does not capture the impact of such UE capabilities. As such, further refinements on Max PLR could be considered on a per UE basis depending on the capabilities of the UE. The JBM and PLC capabilities of the UE, however, are not accounted for in previous solutions and resulting SRVCC handover optimizations are not realized.

According to various embodiments disclosed herein, Real-Time Transport Protocol (RTP)/RTP Control Protocol (RTCP)-based mechanisms may be defined to enable end-to-end signaling of maximum packet loss ratio (PLR) information for enabling SRVCC handover optimization. The embodiments disclosed herein may provide better management of SRVCC handover decisions at the eNB and therefore improve end-to-end quality of VoLTE calls.

Release-15 Work Addressing EVOLP (Enhanced VOLTE Performance)

It may be important to maintain voice quality on Long Term Evolution (LTE) as high as possible. Maintaining high voice quality may avoid or at least delay SRVCC as much as possible. Avoiding or delaying SRVCC may minimize the negative impact on user experience for VoLTE subscribers in areas with weak LTE coverage.

Some RAN implementations may not have sufficient information (e.g., codec configuration information) to perform optimized handover for VoLTE. Consequently, a VoLTE call could be unnecessarily handed over to Second Generation (2G) and/or Third Generation (3G) circuit-switched (CS) networks via SRVCC handover (HO) even though the VoLTE call can survive LTE weak coverage.

The information needed by the RAN to make optimized HO decisions for VoLTE, from an architecture point of view, may be identified. It may also be determined how to provide the RAN with this information. A Release 15 (Rel-15) eVoLP study item was completed to address this problem. 3GPP technical reference (TR) 23.759 was developed. The term "eVoLP" refers to "enhanced Voice over Internet Protocol" or "enhanced VoLTE performance."

Increased robustness of speech calls (as in technical specification (TS) 26.114) is enabled by selection of codecs and their configuration, in-call dynamic rate and mode adaptation, and perhaps application layer full redundancy. Enhanced Voice Services (EVS), especially the EVS Channel Aware mode, demonstrate higher robustness against transmission errors than Adaptive Multi-Rate (AMR) and AMR-wideband (AMR-WB) codecs by encoding packets with partial redundancy.

A "Max PLR" parameter was determined to be used (maximum tolerable packet loss rate) to inform the eNB about the robustness of the selected codec. The robustness (e.g., Max PLR) information can be conveyed to the eNB using either the signaling from the network (PCRF) or signaling from the UE. The eNB can derive the related SRVCC thresholds (implementation dependent) from the Max PLR. In case of multi-rate/multi-mode codec configurations, different codec modes have, in general, different Max PLRs (e.g., different robustness) associated therewith.

The robustness (i.e., Max PLR) information can be conveyed to the eNB using either signaling from the network (PCRF) or signaling from the UE.

Network-Based Architecture Embodiments

The network-based architecture embodiments may rely on the fact that the information on the negotiated codecs and configurations (or codec modes) for the session is available in the PCRF through its knowledge of the Session Description Protocol (SDP) that contains the negotiated session parameters. Based on such information, the PCRF can derive the relevant robustness parameter information (e.g., Maximum Packet Loss Rate) and signal this information to the eNB. The derivation of the robustness parameter information based on the negotiated codec modes can be performed subject to a standardized mapping rule (e.g., with an indication of packet loss rate for each codec mode and calculation of the Maximum Packet Loss Rate based on the negotiated codec modes). An example of the network-based architecture embodiments is depicted by FIG. 9.

Figure 9:
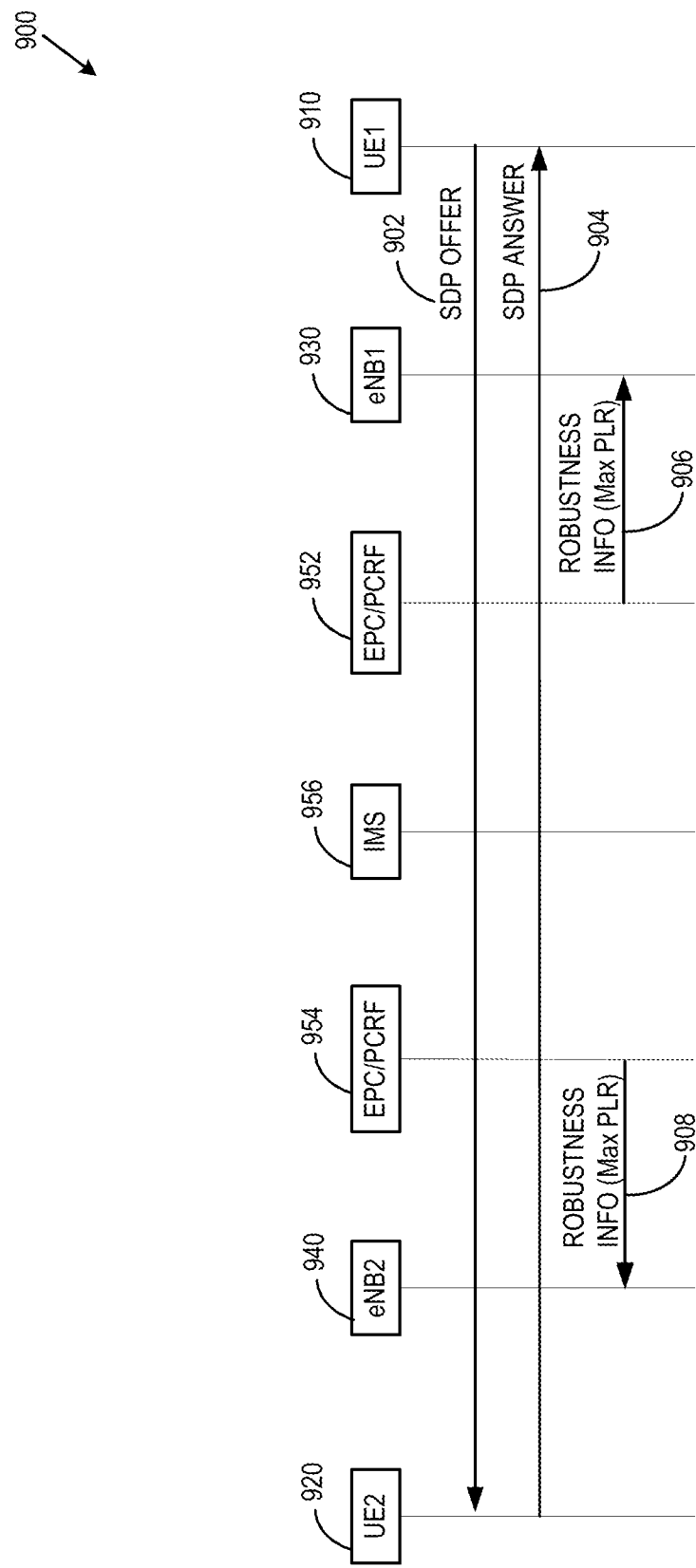
FIG. 9 is a simplified signal flow diagram illustrating a network-based solution to signal robustness information to eNBs in a wireless communication system, according to some embodiments.

FIG. 9 is a simplified signal flow diagram illustrating a network-based solution to signal robustness information to eNBs 930, 940 in a wireless communication system 900, according to some embodiments. The wireless communication system 900 includes a first UE 910 (sometimes referred to herein as "UE1" 910), a second UE 920 (sometimes referred to herein as "UE2" 920), a first eNB 930 (sometimes referred to herein as "eNB1" 930), a second eNB 940 (sometimes referred to herein as "eNB2" 940) a first EPC/PCRF 952, a second EPC/PCRF 954, and an IMS 956.

In operation, UE1 910 generates and transmits an SDP offer message 902 to UE2 920. UE2 920 generates an transmits an SDP answer message 904 to UE1 902. In some embodiments, the EPC/PCRF 952, 954 by default does not know the MTSI client adaptation behavior, and would therefore set the robustness parameter (e.g., Maximum Packet Loss Rate) based on the least robust codec mode among the negotiated codec configurations. MTSI is a multimedia telephony service for the Internet Protocol multimedia core network subsystem. If, however, the EPC/PCRF 952, 954 knows from the SDP that the MTSI client receiver supports adaptation to the most robust codec mode (e.g., that the UE 910, 920 will request the sender to change its encoder to a more robust mode when it detects packet losses), then the PCRF could set the robustness parameter based on the most robust codec mode. This would enable a more optimized SRVCC handover performance. Such indication to the EPC/PCRF 952, 954 is enabled via a new SDP parameter called "adapt." The EPC/PCRF 952, 544 may transmit robustness information 906, 908 (e.g., Max PLR) to the eNBs 930, 940.

UE-Based Architecture Embodiments

The UE-based embodiments may rely on the fact that the information on the negotiated codecs and configurations (or codec modes) for the session is available in the UEs through their knowledge of the SDP that contains the negotiated session parameters. Based on such information, the UEs can derive the relevant robustness parameter (e.g., Maximum Packet Loss Rate) and signal this to the eNBs. Such signaling from a UE to an eNB would have to be defined in the RAN, (e.g., via use of Radio Resource Control (RRC) signaling) to carry the robustness parameter information in TS 36.331 (the exact format of the signaling may be decided by RAN2). The derivation of the robustness parameter information based on the negotiated codec modes can be performed subject to a standardized mapping rule (e.g., with an indication of packet loss rate for each codec mode and calculation of the Maximum Packet Loss Rate based on the negotiated codec modes). The UE-based solution is depicted in FIG. 10.

Figure 10:
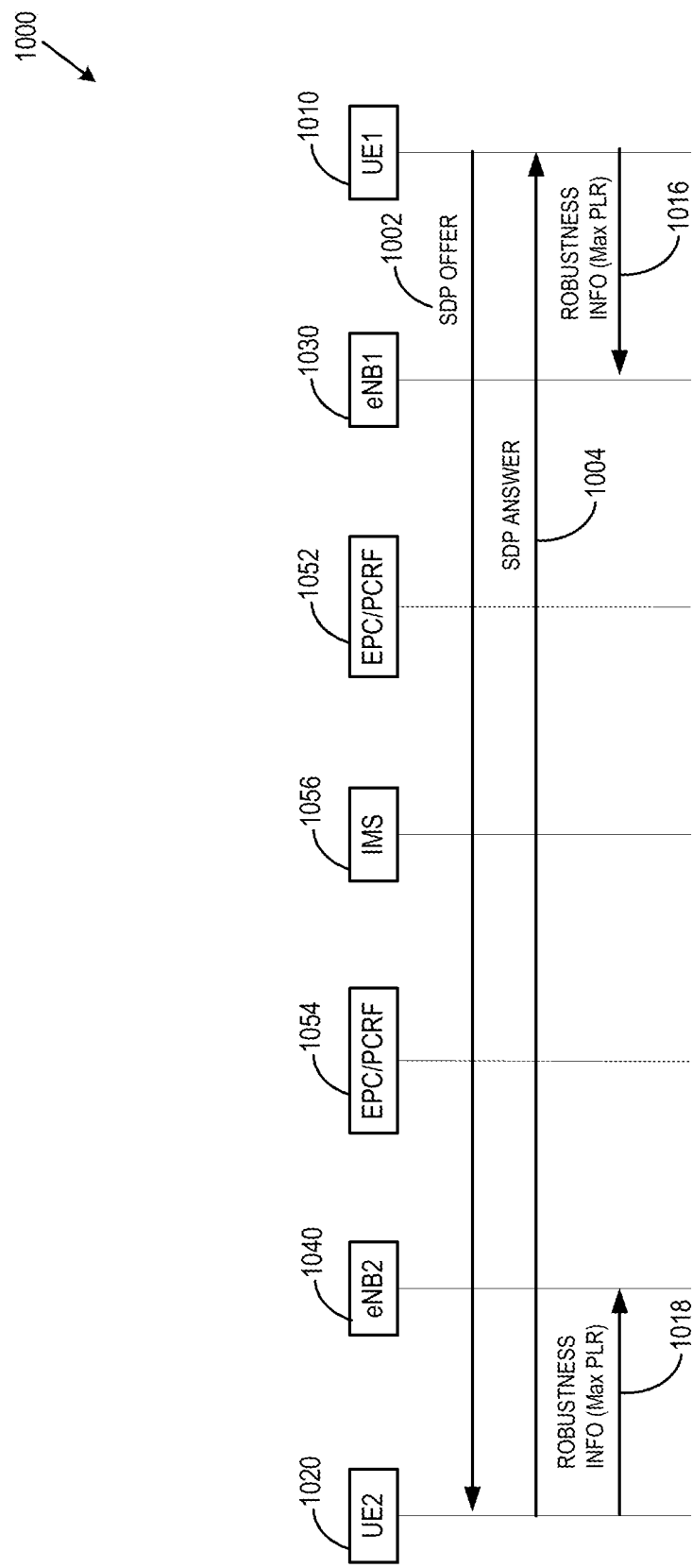
FIG. 10 is a simplified signal flow diagram illustrating a UE-based solution to signal robustness information to eNBs in a wireless communication system, according to some embodiments.

FIG. 10 is a simplified signal flow diagram illustrating a UE-based solution to signal robustness information to eNBs 1030, 1040 in a wireless communication system 1000, according to some embodiments. The wireless communication system 1000 includes a first UE 1010 (sometimes referred to herein as "UE1" 1010), a second UE 1020 (sometimes referred to herein as "UE2" 1020), a first eNB 1030 (sometimes referred to herein as "eNB1" 1030), a second eNB 1040 (sometimes referred to herein as "eNB2" 1040), a first EPC/PCRF 1052, a second EPC/PCRF 1054, and an IMS 1056.

In operation, UE1 1010 generates and transmits an SDP offer message 1002 to UE2 1020. UE2 920 generates an transmits an SDP answer message 904 to UE1 902. For the UE-based embodiments, it can be observed that the UEs 1010, 1020 (e.g., MTSI client) not only know the negotiated codecs and configurations (or codec modes), but also the selected codec configuration or mode for the currently transmitted RTP stream (e.g., as determined via the outcome of the media adaptation in the UEs 1010, 1020). As such, the UEs 1010, 1020 can determine the packet loss rate corresponding to the selected codec configuration and signal the relevant robustness parameter information 1016, 1018 (e.g., Max PLR) to the eNBs 1030, 1040. Therefore, an indication at the SDP level via the "adapt" parameter is not necessary for the UE-based signaling solution, and an optimized SRVCC handover performance can be ensured without supporting the "adapt" feature in the SDP and enforcing a particular adaptation behavior on the MTSI client in the UE.

Moreover, depending on the change in the selected codec configuration or mode, the UEs 1010, 1020 can dynamically update the eNBs 1030, 1040 on the corresponding robustness parameter information (e.g., updated value for Max PLR).

Enhancements

In addition to the negotiated codecs and codec modes, the end-to-end quality and robustness of the VoLTE connection also depends on UE capabilities including, for example, jitter buffer management (JBM) and packet loss concealment (PLC). In the meantime, the Max PLR parameter derived by the PCRF (e.g., in the network-based architecture above) or the UE (e.g., in the UE-based architecture above) and signaled to the eNB does not capture the impact of such UE capabilities. As such, further refinements on Max PLR could be considered on a per UE basis, depending on the capabilities of the UE.

The UE may consider its JBM capabilities, its PLC capabilities, its real-time quality of experience (QoE) measurements, or combinations thereof to derive a recommended Max PLR value. In other words the UE may consider these factors to determine a recommended maximum end-to-end packet loss rate that the terminal can tolerate for a given codec/mode when using its JBM and PLC implementation. The UE may signal this parameter, or some indication derived from it, to the network (e.g., to the eNB). The robustness parameter values used in the eNB may then use, or be refined based on, this recommendation. A UE with advanced JBM and PLC capabilities may determine a recommended Max PLR value that is higher than the Max PLR corresponding to the most robust codec configuration. This means that the PLC and JBM capabilities of the UE may be delivering further robustness on top of that delivered by the most robust codec configuration. If the eNB gets such an indication of additional robustness from the UE via the recommended Max PLR signaling, it may further delay the SRVCC handover decision even when the Max PLR value (based on the most robust codec configuration) is exceeded. This leads to more optimized SRVCC handovers. Furthermore, since there are typically two radio links in the end-to-end path from the sending terminal to the receiving terminal, the information is shared with the two eNBs in the transport path to determine how to set their SRVCC handover thresholds to achieve appropriate packet_loss_rate targets.

It should be noted that this recommended Max PLR value is an additional parameter for consideration by the eNB, on top of the Max PLR value the eNB would receive from the PCRF (in case of the network-based architecture) or from the UE (in case of the UE-based architecture). If this information, or any other information derived from it, is to be signaled to the eNB, suitable RAN-level signaling of this information from the UE to the eNB (e.g., at the RRC level as in TS 36.331) should be defined.

Figure 11:
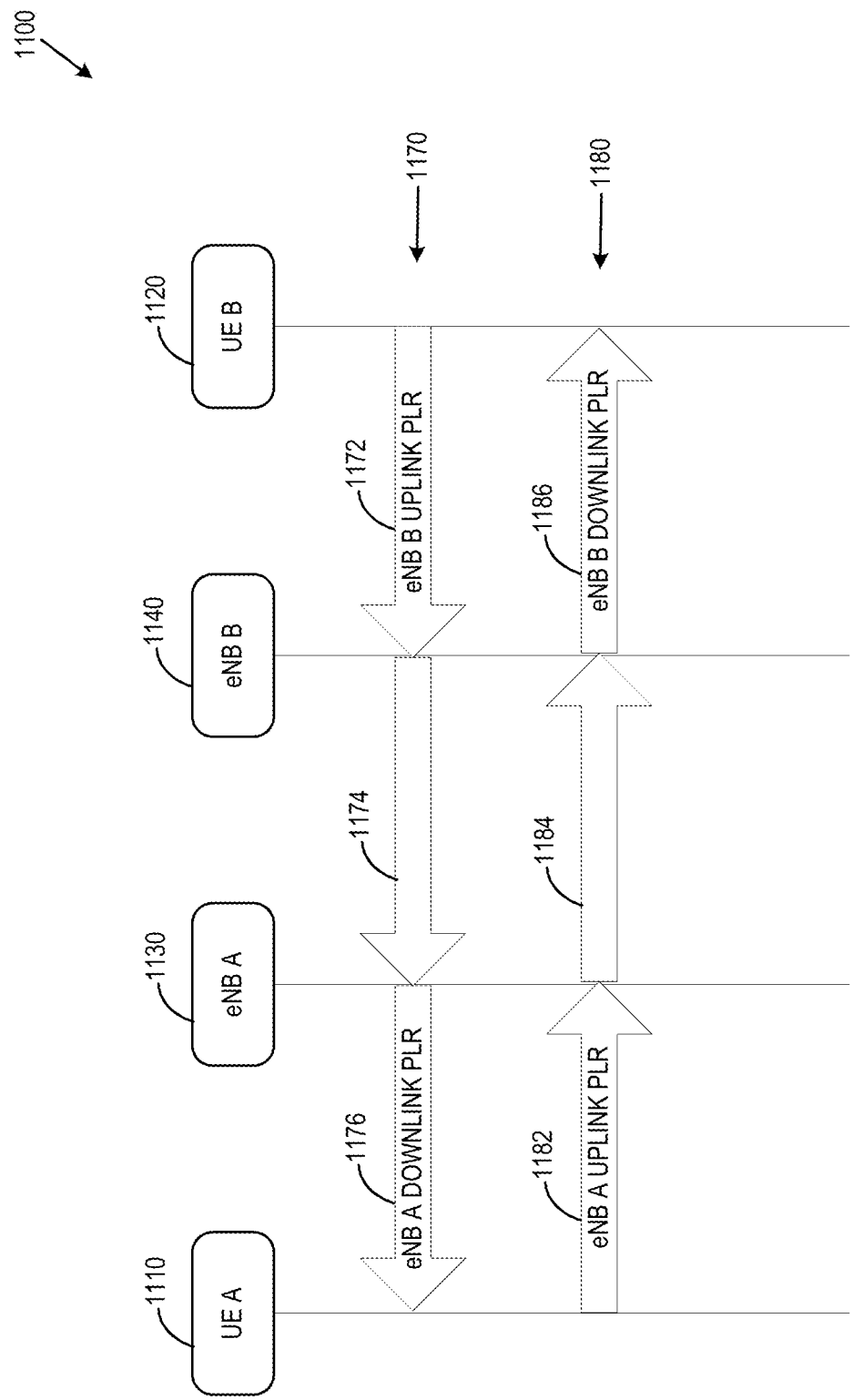
FIG. 11 is a simplified illustration of a wireless communication system, according to some embodiments.

FIG. 11 is a simplified illustration of a wireless communication system 1100, according to some embodiments. One of the challenges in setting the handover thresholds is to ensure that the end-to-end error rate across the transport path from the media sender to the receiver does not exceed the maximum packet loss (Max PLR) that the codec, the PLC implementation, and the JBM implementation in the receiving UE can handle. To illustrate, the wireless communication system 1100 includes a UE A 1110, a UE B 1120, an eNB A 1130, and an eNB B 1140. FIG. 11 illustrates an end-to-end VoLTE flow 1170 from UE B 1120 to UE A 1110 and an end-to-end VoLTE flow 1180 from UE A 1110 to UE B 1120. In the end-to-end VoLTE flow 1170, an eNB A downlink PLR 1176 is the maximum PLR value to be set as the threshold to trigger SRVCC for the DL connection between eNB A 1130 and UE A 1120. Likewise, eNB_B_UL_PLR 1172 is the maximum PLR value to be set as the threshold to trigger SRVCC for the UL connection between eNB B and UE B. It is assumed that a backhaul 1174 between eNB B 1140 and eNB A 1130 introduces negligible error. Under this assumption, the following PLR condition should be maintained:

(eNB *A* downlink PLR 1176)+(eNB *B* uplink PLR 1172)≤Max PLR codec and (PLC+JBM in UE *A* 1110)

As such, UE A 1110 can determine the maximum PLR it can tolerate based on its PLC and JBM implementation and then decide how this should be distributed between eNB A downlink PLR 1176 and eNB B uplink PLR 1172. In particular, UE A 1110 can decide on the value of eNB A downlink PLR 1176 based on the evaluation of the local downlink radio conditions between UE A 1110 and eNB A 1130, and then determine eNB B uplink PLR 1172 by subtracting eNB A downlink PLR 1176 from the maximum end-to-end PLR (Max PLR at UE A 1110). While UE A 1110 can signal eNB A downlink PLR 1176 to its eNB A 1130 locally over the RAN interface (e.g., via RRC signaling), UE A 1110 may not signal eNB B uplink PLR 1172 to eNB B 1140. To signal eNB B uplink PLR 1172 to eNB B 1140, an RTCP signaling approach described below in the section titled "APPLICATION LAYER SIGNALING OF MAX PLR INFORMATION" may be implemented. Also, UE B 1120 cannot signal eNB B uplink PLR 1172 to eNB B 1140 because UE B 1120 does not know eNB B uplink PLR 1172. To inform UE B 1120 of eNB B uplink PLR 1172 and enable UE B 1120 to signal eNB B uplink PLR 1172 to eNB B 1140, it is proposed herein that the RTCP signaling method proposed in the section titled "APPLICATION LAYER SIGNALING OF MAX PLR INFORMATION" be used. UE B 1120 can then signal the eNB B uplink PLR 1172 to eNB B 1140 locally over its RAN interface. Based on the evaluation of the local uplink radio conditions between UE B 1120 and eNB B 1140, UE B 1120 may further update the value of eNB B uplink PLR 1172 and send this information to UE A 1110 via an RTP header extension method proposed in the section titled "APPLICATION LAYER SIGNALING OF MAX PLR INFORMATION." As such, both the media receiver and the media sender have means to exchange UL PLR information in order to dynamically optimize the allocation of DL PLR and UL PLR and lead to the most optimal selection of the SRVCC handover thresholds on both ends of the link (e.g., the end-to-end VoLTE flow 1170).

In other embodiments, UE A 1110 can determine the maximum PLR it can tolerate based on its PLC and JBM implementation and then UE B 1120 may learn this maximum PLR value during the SDP negotiations. As such, UE B 1120 (as the media sender) may then decide how this should be distributed between eNB A downlink PLR 1176 and eNB B uplink PLR 1172. In particular, UE B 1120 can decide on the value of eNB B uplink PLR 1172 based on the evaluation of the local downlink radio conditions between UE B 1120 and eNB B 1140, and then determine eNB A downlink PLR 1176 by subtracting eNB B uplink PLR 1172 from the maximum end-to-end PLR (Max PLR at UE A 1110). It is proposed herein that the RTP header extension method proposed in the section titled "APPLICATION LAYER SIGNALING OF MAX PLR INFORMATION" be used in order to convey the information on eNB A downlink PLR 1176 from UE B 1120 to UE A 1110. UE A 1110 can then signal this information to eNB A 1130 locally over its RAN interface.

In some embodiment, the proposed RTP header extension method may be used to convey the DL and UL PLR allocations for both forward and backward RTP streams.

Similarly, in the other direction of transmitting media from UE A 1110 to UE B 1120 (end-to-end VoLTE flow 1180), the following PLR conditions should be maintained (assuming that backhaul 1184 between eNB A 1130 and eNB B 1140 introduces negligible error):

(eNB *A* uplink PLR 1182)+(eNB *B* downlink PLR 1186)≤max PLR codec and (PLC+JBM in UE *B* 1120)

Here, eNB B downlink PLR 1186 is the maximum PLR value to be set as the threshold to trigger SRVCC for the DL connection between eNB B 1140 and UE B 1120. Likewise, eNB A uplink PLR 1182 is the maximum PLR value to be set as the threshold to trigger SRVCC for the UL connection between eNB A 1130 and UE A 1110.

As such, UE B 1120 can determine the maximum PLR it can tolerate based on its PLC and JBM implementation and then decide how this should be distributed between eNB A uplink PLR 1182 and eNB B downlink PLR 1186. In particular, UE B 1120 can decide on the value of eNB B downlink PLR 1186 based on the evaluation of the local downlink radio conditions between UE B 1120 and eNB B 1140, and then determine eNB A uplink PLR 1182 by subtracting eNB B downlink PLR 1186 from the maximum end-to-end PLR (Max PLR at UE B 1120). While UE B 1120 can signal eNB B downlink PLR 1186 to its eNB B 1140 locally over the RAN interface (e.g., via RRC signaling), UE B 1120 cannot signal eNB A uplink PLR 1182 to eNB A 1130. UE A 1110 cannot signal eNB A uplink PLR 1182 to eNB A 1130 because UE A 1110 does not know the eNB A uplink PLR 1182. To inform UE A 1110 of the eNB A uplink PLR 1182, it is proposed herein that the RTCP signaling method of the section titled "APPLICATION LAYER SIGNALING OF MAX PLR INFORMATION" be used. UE A 1110 can then signal the eNB A uplink PLR 1182 to eNB A 1130 locally over its RAN interface. Based on the evaluation of the local uplink radio conditions between UE A 1110 and eNB A 1130, UE A 1110 may further update the value of eNB A uplink PLR 1182 and send this information to UE B 1130 via the use of the RTP header extension method proposed in the section titled "APPLICATION LAYER SIGNALING OF MAX PLR INFORMATION."

In some embodiments, the transmitting UE (UE B 1120 for flow 1170 and UE A 1110 for flow 1180) can estimate also the UE PLR and send this information to the receiving UE (UE A 1110 for flow 1170 and UE B 1120 for flow 1180) via the RTP header extension method. In the end, a DL UE can have the following information: (i) Missing RTP packet, (ii) Measured PLR from MAC/PHY in DL, and (iii) Estimated PLR from the UL sender UE. Based on this information, the UE may determine if some packet loss has happened in the network itself. This information may then be used for network diagnosis. The UE may trigger a report to the network or media gateway. In addition to PLR, the UE may report a distribution indication. For instance, to a same average PLR, the packet loss can be evenly distributed, or there may be a short interruption and then normal transmission.

Application Layer Signaling of Max PLR Information

While RAN-layer delay budget reporting may allow UEs to locally adjust air interface delay, such a mechanism may not provide coordination between the UEs to manage delay and jitter on an end-to-end basis. To enable the dynamic allocation of UL PLR and DL PLR as discussed above, the following RTP/RTCP signaling (e.g., to signal delay budget information and/or Max PLR information across UEs) and RTP header extension frameworks can be considered in order to exchange UL Max PLR information as described above (or other kinds of information of equivalent context):

A new RTCP feedback (FB) message type to carry Max PLR or uplink packet loss ratio (UL PLR) information during the RTP streaming of media may be implemented (signaled from a media receiver to a media sender);

A new SDP parameter on the RTCP-based ability to signal Max PLR or UL PLR information during the IMS/session initiation protocol (SIP) based capability negotiations;

A new RTP header extension type to signal for UL PLR information during the RTP streaming of media (signaled from a media sender to a media receiver);

A new SDP parameter on the RTP-based ability to signal UL PLR information during the IMS/SIP-based capability negotiations;

A new RTP header extension type to signal for UL PLR information during the RTP streaming of media for the reverse stream (signaled from a media receiver to a media receiver); and A new SDP parameter on the RTP-based ability to signal UL PLR information during the IMS/SIP-based capability negotiations for the reverse stream.

The signaling of Max or UL PLR information may use RTCP feedback messages as specified in IETF 4585. As such, the RTCP feedback message is sent from the MTSI receiver to the MTSI sender to convey to the sender about the tolerable Max or UL PLR information. The recipient of the RTCP feedback message may then convey this information to its eNB over the RAN interface (e.g., by using RRC signaling).

The RTCP feedback message is identified by PT=PSFB (206). FMT shall be set to the value "Y" for UL PLR information. The RTCP feedback method may involve signaling of Max or UL PLR information in both of the immediate feedback and early RTCP modes.

In some embodiments the FCI format can be as follows: the FCI can contain exactly one instance of the Max or UL PLR information, which includes the Max or UL PLR value "ULPLR," which may be specified in milliseconds (e.g., 16 bits). It should be noted that this FCI format is for illustration purposes, and other formats can also be defined to convey Max or UL PLR information. The FCI for the proposed RTCP feedback message can follow the format shown by FIG. 12.

FIG. 12 is a simplified illustration of an example FCI format of an RTCP feedback message 1200, according to some embodiments. The RTCP feedback message 1200 includes the parameter ULPLR 1260 and zero padding 1270. The high byte should be followed by the low byte, where the low byte holds the least significant bits.

FIG. 13 is a simplified illustration of an example FCI format of an RTCP feedback message 1300, according to some embodiments. In some such embodiments, the ratio between UL PLR and DL PLR values may be signaled by the RTCP feedback message 1300 (e.g., signaled with a 16-bit parameter). Accordingly, the RTCP feedback message may include a parameter UL_DL_PLR_Ratio 1360 indicating this ratio of UL PLR and DL PLR values, and may, for example, be specified in 16 bits. The RTCP feedback message 1300 may also include zero padding 1370.

FIG. 14 is a simplified illustration of a format of an example RTP header extension message 1400, according to some embodiments. A 3GPP MTSI client (based on TS 26.114) supporting the RTCP feedback messages discussed above can offer such capability in the SDP for all media streams containing video/audio. The offer can be made by including the a=rtcp-fb attribute in conjunction with the following parameter: 3gpp-max/ul-plr. A wildcard payload type ("*") may be used to indicate that the RTCP feedback attribute applies to all payload types. An example usage of this attribute may be as follows:

a=rtcp-fb:*3gpp-max/ul-plr

The ABNF for rtcp-fb-val corresponding to the feedback type "3gpp-max/ul-plr" may be as follows:

rtcp-fb-val=/"3gpp-max/ul-plr"

In some settings, the UL PLR information may also be signaled by the MTSI sender to the MTSI receiver as part of the transmitted RTP stream using RTP header extensions, as discussed above. An example format is shown by FIG. 14, where UL PLR value ULPLR 1460 is specified in 16 bits. The example RTP header extension message 1400 also includes an ID 1462, a len=7 1464, and zero padding 1470.

FIG. 15 is a simplified illustration of a format of an example RTP header extension message 1500, according to some embodiments. In some embodiments, the ratio between UL PLR and DL PLR values may be signaled instead in the RTP header extension message 1500, potentially again specified via 16 bits. The following format may be used: Ratio of UL PLR and DL PLR values UL_DL_PLR_Ratio 1560 (e.g., specified in 16 bits). The example RTP header extension message 1500 also includes an ID 1562, len=7 1564, and zero padding 1570.

FIG. 16 is a simplified illustration of a format of an example RTP header extension message 1600, according to some embodiments. In some embodiments, the RTP header extension method may be used to convey the DL and UL PLR allocations for both forward and backward RTP streams. Such embodiments may include a format of a ratio of UL PLR and DL PLR values UL_DL_PLR Ratio1 1660A for forward link (e.g., specified in 12 bits); and/or a ratio of UL PLR and DL PLR values UL_DL_PLR_Ratio2 1660B for reverse link (e.g., specified in 12 bits). The RTP header extension message 1600 also includes an ID 1662, and a len=7 1664.

A 3GPP MTSI client supporting this RTP header extension message can offer such capability in the SDP for all media streams containing video/audio. This capability can be offered by including the a=extmap attribute indicating a dedicated URN under the relevant media line scope. The URN corresponding to the capability to signal UL PLR information is: urn:3gpp:ul-plr. An example usage of this URN in the SDP follows:

a=extmap:7 urn:3gpp:ul:plr

The number 7 in the example may be replaced with any number in the range 1-14.

Figure 17:
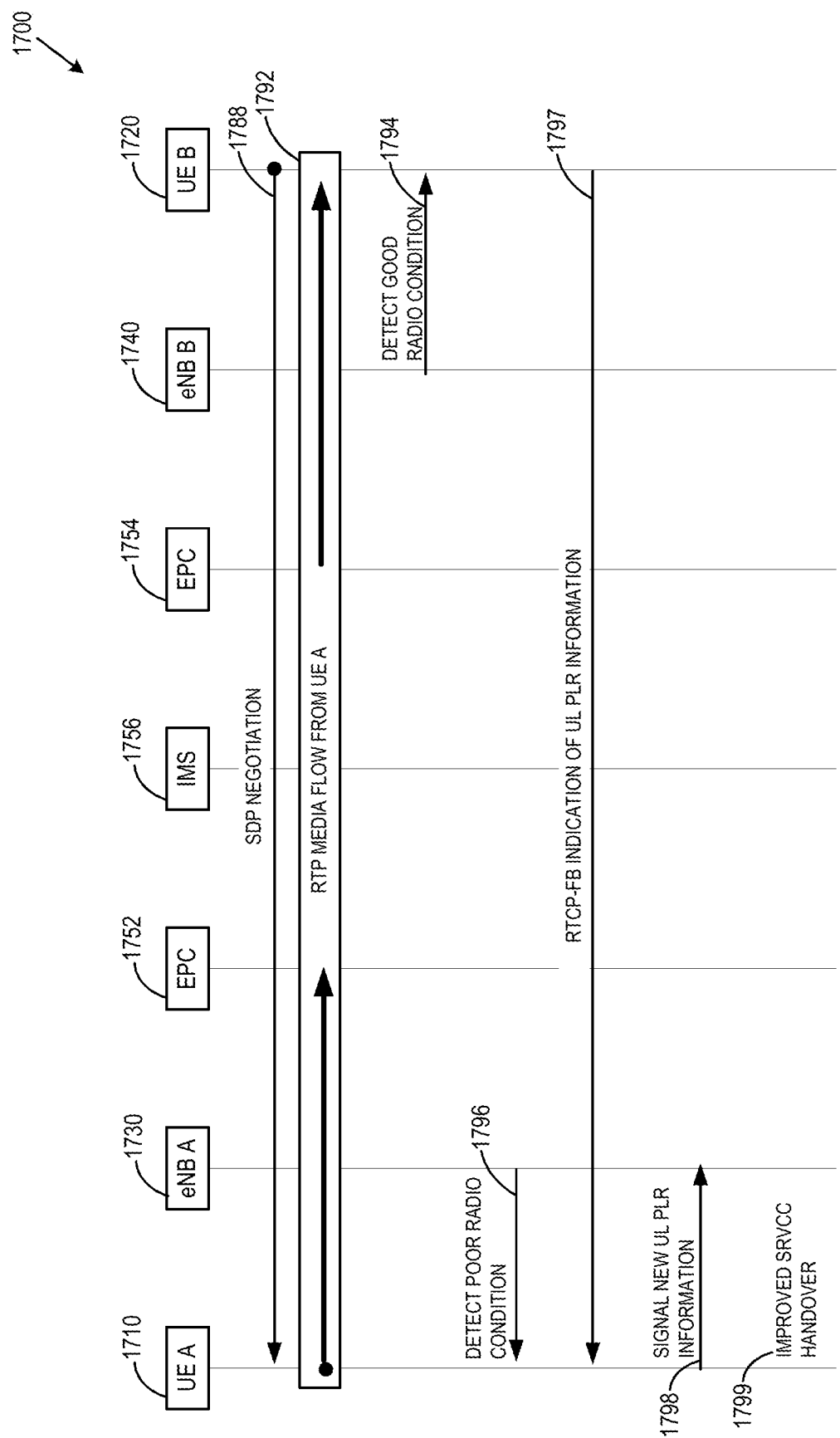
FIG. 17 is a simplified signal flow diagram illustrating end-to-end application layer signaling of Max PLR in a wireless communication system, according to some embodiments.

In some embodiments the UL PLR information may also be signaled by the MTSI receiver to the MTSI receiver as part of the reverse RTP stream using RTP header extensions, as described above. The above RTP header extension format may also be used in this context. FIG. 17 shows an example procedure (signaling flows) of the above dynamic DL PLR and UL PLR allocation framework based on the use of RTCP feedback signaling.

FIG. 17 is a simplified signal flow diagram illustrating end-to-end application layer signaling of Max PLR in a wireless communication system 1700, according to some embodiments. FIG. 17 is an example usage of dynamic DL PLR and UL PLR allocation framework based on the use of RTCP feedback signaling. The wireless communication system 1700 includes a UE A 1710, a UE B 1720, an eNB A 1730, an eNB B 1740, a first EPC 1752, a second EPC 1754, and an IMS 1756. For purposes of FIG. 17, eNB A 1730 is servicing UE A 1710 and eNB B 1740 is servicing UE B 1720.

In operation, UE A 1710 and UE B 1720 exchange SDP negotiations 1788. These SDP negotiations 1788 include information on (i) max_e2e_PLR on UE A 1710 and UE B 1720, (ii) RTCP-based ability to signal UL PLR information as discussed above, and (iii) RTP header extension-based capability to exchange UL PLR information as discussed above. Following the SDP negotiations 1788, it is possible that DL PLR and UL PLR values may be statically configured and the respective SRVCC thresholds may be determined. For instance, from the perspective of UE B 1720, this means eNB B downlink PLR and eNB A uplink PLR are also statically set.

UE A 1710 sends an RTP media flow 1792 to UE B 1720. In some instances, UE B 1720 detects 1794 DL good radio conditions locally (e.g., UE B 1720 measures low BLER over the local radio link). As a result, UE B 1720 concludes that the local radio conditions will support the most robust codec mode with negligibly small PLR. The chances of SRVCC handover in this instance are quite small. On the contrary, in some instances UE A 1710 detects 1796 UL poor radio conditions locally (e.g., UE A 1710 measures high BLER over the local radio link). As a result, UE A 1710 concludes that the local radio conditions may hardly support the most robust codec mode, and that there is a good chance that SRVCC handover will need to be triggered.

UE B 1720 sends to UE A 1710 an RTCP feedback message 1797 including UL PLR information, where the eNB A uplink PLR value is set to a value relatively close to max_e2e_PLR for UE B 1720. UE A 1710 signals 1798 the new UL PLR value to eNB A 1730. Then eNB A 1730 updates its SRVCC handover threshold based on the new UL PLR value, which is higher than the statically set UL PLR value. As a result, SRVCC handover over the UL connection from UE A 1710 to eNB A 1730 is improved 1799 (e.g., delayed further due to the dynamically signaled UL PLR information from UE B 1720).

In some embodiments, the electronic device(s), network(s), system(s), chip(s) or component(s), or portions or implementations thereof, of any figure herein may be configured to perform one or more processes, techniques, or methods as described herein, or portions thereof.

EXAMPLES B

The following is another non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, the examples listed in Examples A above, and the above disclosed embodiments, are not combinable, it is contemplated within the scope of the disclosure that such examples and embodiments are combinable.

Example 1 may include a local user equipment (UE) operable to perform multimedia telephony with a remote UE, the local UE having one or more processors to: communicate, from the local UE to the remote UE, the maximum packet loss ratio (Max PLR) information via a real-time transport control protocol (RTCP) feedback message; and based on the signaled Max PLR information, the remote UE requests from its local evolved NodeB eNB to adjust the single radio voice call continuity (SRVCC) handover threshold of its uplink connection based on the Max PLR value.

Example 2 may include the local UE of Example 1 or some other example herein, wherein Max PLR information pertains to the maximum packet loss ratio for the uplink radio connection from the remote UE to its local eNB.

Example 3 may include the local UE of Example 1 or some other example herein, wherein the one or more processors are further to receive a session description protocol (SDP) offer message from the remote UE that includes a real-time transport control protocol (RTCP) feedback attribute that is associated with a Third Generation Partnership Project (3GPP) 3gpp-max-plr parameter, thereby indicating that the remote UE supports the reception of Max PLR information signaled via RTCP feedback messages.

Example 4 may include the local UE of Example 1 or some other example herein, wherein the one or more processors are further to send a session description protocol (SDP) answer message to the remote UE that includes a real-time transport control protocol (RTCP) feedback attribute that is associated with a Third Generation Partnership Project (3GPP) 3gpp-max-plr parameter, thereby acknowledging that the local UE supports the transmission of Max PLR information signaled via RTCP feedback messages.

Example 5 may include the local UE of Example 1 or some other example herein, wherein the RTCP feedback message communicated from the local UE to the remote UE includes a descriptor that contains Max PLR information.

Example 6 may include the local UE of Example 1 or some other example herein, wherein the Max PLR information is determined based on the difference between local UE's assessment of how much end-to-end Max PLR the local UE can tolerate during reception based on its jitter buffer management and packet loss concealment capabilities and packet loss ratio value estimate of the local downlink radio conditions between the local UE and its eNB.

Example 7 may include a local user equipment (UE) operable to perform multimedia telephony with a remote UE, the local UE having one or more processors configured to: communicate, from the local UE to the remote UE, an indication of the uplink (UL) maximum packet loss ratio (MaxPLR) information for the media RTP stream delivered from the remote UE to the local UE via a real-time transport control protocol (RTCP) feedback message; based on the signaled uplink MaxPLR information, the remote UE requests from its local eNB to adjust the SRVCC handover threshold of its uplink (UL) connection based on the uplink MaxPLR value.

Example 8 may include the local UE of Example 7 or some other example herein, wherein the indication of the uplink MaxPLR information pertains to the maximum tolerable packet loss ratio value for the uplink (UL) radio connection from the remote UE to its local eNB above which SRVCC handover must be activated.

Example 9 may include the local UE of Example 7 or some other example herein, wherein the indication of the uplink MaxPLR information pertains to the ratio of (the maximum tolerable packet loss ratio value for the uplink (UL) radio connection from the remote UE to its local eNB above which SRVCC handover must be activated) and (the maximum tolerable packet loss ratio value for the downlink (DL) radio connection from the local UE and its local eNB above which SRVCC handover must be activated).

Example 10 may include the local UE of Example 7 or some other example herein, wherein the one or more processors are further configured to receive a session description protocol (SDP) offer message from the remote UE that includes an RTCP feedback attribute that is associated with a Third Generation Partnership Project (3GPP) 3gpp-ul-plr parameter, thereby indicating that the remote UE supports the reception of UL MaxPLR information signaled via RTCP feedback messages.

Example 11 may include the local UE of Example 7 or some other example herein, wherein the one or more processors are further configured to send a session description protocol (SDP) answer message to the remote UE that includes an RTCP feedback attribute that is associated with a Third Generation Partnership Project (3GPP) 3gpp-ul-plr parameter, thereby acknowledging that the local UE supports the transmission of UL MaxPLR information signaled via RTCP feedback messages.

Example 12 may include the local UE of Example 7 or some other example herein, wherein the RTCP feedback message communicated from the local UE to the remote UE includes a descriptor that contains UL MaxPLR information.

Example 13 may include the local UE of Example 7 or some other example herein, wherein the UL MaxPLR information is determined based on the difference between (local UE's assessment of how much end-to-end MaxPLR the local UE can tolerate during media reception from the remote UE based on the negotiated codec modes and its jitter buffer management and packet loss concealment capabilities) and (packet loss ratio to serve as the SRVCC handover threshold value for the local downlink (DL) connection to the local UE, considering local UE's assessment of the radio conditions between the local UE and its eNB).

Example 14 may include the local UE of Example 7 or some other example herein, wherein the remote UE communicates to the local UE, an indication of the uplink maximum packet loss ratio (UL MaxPLR) information for the media RTP stream delivered from the remote UE to the local UE via a real-time transport protocol (RTP) header extension message and based on the signaled UL MaxPLR information, the local UE requests from its local eNB to adjust the SRVCC handover threshold of its downlink (DL) connection based on the received UL MaxPLR value.

Example 15 may include the local UE of Example 14 or some other example herein, wherein the indication of the uplink MaxPLR information pertains to the maximum tolerable packet loss ratio value for the uplink (UL) radio connection from the remote UE to its local eNB above which SRVCC handover must be activated.

Example 16 may include the local UE of Example 14 or some other example herein, wherein the indication of the uplink MaxPLR information pertains to the ratio of (the maximum tolerable packet loss ratio value for the uplink (UL) radio connection from the remote UE to its local eNB above which SRVCC handover must be activated) and (the maximum tolerable packet loss ratio value for the downlink (DL) radio connection from the local UE and its local eNB above which SRVCC handover must be activated).

Example 17 may include the local UE of Example 7 or some other example herein, wherein the UL MaxPLR information in the RTP header extension message is determined by the remote UE to be the packet loss ratio to serve as the SRVCC handover threshold value for the uplink (DL) connection from the remote UE to its eNB, considering remote UE's assessment of the radio conditions between the remote UE and its eNB.

Example 18 may include the local UE of Example 14 or some other example herein, wherein the one or more processors are further configured to receive a session description protocol (SDP) offer message from the remote UE that includes an extension map attribute that is associated with a Third Generation Partnership Project (3GPP) ul-plr parameter, thereby indicating that the remote UE supports transmission of uplink MaxPLR information signaled via RTP header extension messages.

Example 19 may include the local UE of Example 14 or some other example herein, wherein the one or more processors are further configured to send a session description protocol (SDP) answer message to the remote UE that includes an extension map attribute that is associated with a Third Generation Partnership Project (3GPP) ul-plr parameter, thereby acknowledging that the local UE supports reception of uplink MaxPLR information signaled via RTP header extension messages.

Example 20 may include the local UE of Example 14 or some other example herein, wherein the RTP header extension message communicated from the remote UE to the local UE includes a descriptor that contains UL MaxPLR information Example 21 may include the local UE of Example 14 or some other example herein, wherein the SRVCC handover threshold for the downlink (DL) connection between the local UE and its eNB is adjusted based on the difference between (local UE's assessment of how much end-to-end MaxPLR the local UE can tolerate during media reception from the remote UE based on the negotiated codec modes and its jitter buffer management and packet loss concealment capabilities) and (UL MaxPLR value in the received RTP header extension message from the remote UE).

Example 22 may include a local user equipment (UE) operable to perform multimedia telephony with a remote UE, the local UE having one or more processors configured to: communicate, from the local UE to the remote UE, an indication of the downlink (DL) maximum packet loss ratio (MaxPLR) information for the media RTP stream delivered from the local UE to the remote UE via a RTP header extension message, and based on the signaled downlink MaxPLR information, the remote UE requests from its local eNB to adjust the SRVCC handover threshold of its downlink (DL) and/or uplink (UL) connection based on the downlink MaxPLR value.

Example 23 may include the local UE of Example 22 or some other example herein, wherein the local UE obtains the maximum end-to-end PLR of the remote UE during the capability negotiation using the session description protocol (SDP)

Example 24 may include the local UE of Example 22 or some other example herein, wherein the indication of the downlink MaxPLR information pertains to the maximum tolerable packet loss ratio value for the downlink (DL) radio connection between the remote UE to its local eNB above which SRVCC handover must be activated Example 25 may include the local UE of Example 22 or some other example herein, wherein the indication of the downlink MaxPLR information pertains to the ratio of (the maximum tolerable packet loss ratio value for the uplink (UL) radio connection from the remote UE to its local eNB above which SRVCC handover must be activated) and (the maximum tolerable packet loss ratio value for the downlink (DL) radio connection from the local UE and its local eNB above which SRVCC handover must be activated)

Example 26 may include the local UE of Example 22 or some other example herein, wherein the one or more processors are further configured to receive a session description protocol (SDP) offer message from the remote UE that includes an extension map attribute that is associated with a Third Generation Partnership Project (3GPP) dl-plr parameter, thereby indicating that the remote UE supports reception of downlink MaxPLR information signaled via RTP header extension messages.

Example 27 may include the local UE of Example 22 or some other example herein, wherein the one or more processors are further configured to send a session description protocol (SDP) answer message to the remote UE that includes an extension map attribute that is associated with a Third Generation Partnership Project (3GPP) dl-plr parameter, thereby acknowledging that the local UE supports transmission of downlink MaxPLR information signaled via RTP header extension messages.

Example 28 may include the local UE of Example 22 or some other example herein, wherein the RTP header extension message communicated from the local UE to the remote UE includes a descriptor that contains DL MaxPLR information Example 29 may include the local UE of Example 22 or some other example herein, wherein the RTP header extension message communicated from the local UE to the remote UE includes a descriptor that contains ratio between UL MaxPLR and DL MaxPLR information Example 30 may include the local UE of Example 22 or some other example herein, wherein the DL MaxPLR information is determined based on the difference between (remote UE's assessment of how much end-to-end MaxPLR the remote UE can tolerate during media reception from the local UE based on the negotiated codec modes and its jitter buffer management and packet loss concealment capabilities, with this parameter signalled from remote UE to local UE) and (packet loss ratio to serve as the SRVCC handover threshold value for the local uplink (UL) connection of the local UE, considering local UE's assessment of the radio conditions between the local UE and its eNB).

Example 31 may include an apparatus capable of performing multimedia telephony with a remote device, the apparatus comprising: communication means for transmitting, via a real-time transport control protocol (RTCP) feedback message, an uplink (UL) maximum packet loss ratio (MaxPLR) indication that is to include information for a media RTP stream delivered from the remote device to the apparatus, wherein the UL MaxPLR information is for requesting adjustment of a Single Radio Voice Call Continuity (SRVCC) handover (HO) threshold of a UL connection of the remote device based on a UL MaxPLR value in the UL MaxPLR indication.

Example 32 may include the apparatus of Example 31 or some other example herein, wherein the UL MaxPLR indication is to indicate a maximum tolerable packet loss ratio value for the UL radio connection from the remote device to a remote evolved NodeB (eNB) above which an SRVCC HO is to be activated.

Example 33 may include the apparatus of Example 31 or some other example herein, wherein the UL MaxPLR indication is to indicate:
a ratio of a maximum tolerable packet loss ratio value for the UL radio connection from the remote device to the remote eNB above which an SRVCC HO is to be activated, and a maximum tolerable packet loss ratio value for a downlink (DL) radio connection from the apparatus to a local eNB above which an SRVCC HO is to be activated.

Example 34 may include the apparatus of Example 31 or some other example herein, wherein the communication means is for receiving a session description protocol (SDP) offer message from the remote device, wherein the SDP offer message is to include an RTCP feedback attribute that is associated with a Third Generation Partnership Project (3GPP) parameter (3gpp-ul-plr), wherein the 3gpp-ul-plr is to indicate that the remote device supports reception of UL MaxPLR information signaled via RTCP feedback messages.

Example 35 may include the apparatus of Example 36 or some other example herein, wherein the communication means is for transmitting an SDP answer message to the remote device, wherein the SDP answer is to include the 3gpp-ul-plr, wherein the 3gpp-ul-plr is to indicate acknowledgment that the apparatus supports the transmission of UL MaxPLR information signaled via RTCP feedback messages.

Example 36 may include the apparatus of Example 35 or some other example herein, wherein the RTCP feedback message is to include a descriptor that comprises the UL MaxPLR information.

Example 37 may include the apparatus of Example 31 or some other example herein, further comprising: means for determining the UL MaxPLR information based on a difference between an (1) assessment of how much end-to-end MaxPLR the apparatus is capable of tolerating during media reception from the remote device based on an negotiated codec modes and a jitter buffer management and packet loss concealment capabilities, and (2) a packet loss ratio to serve as an SRVCC HO threshold value for a DL connection to the apparatus, wherein (2) is in consideration of the assessment of radio conditions between the apparatus and the local eNB.

Example 38 may include the apparatus of Example 31 or some other example herein, wherein the communication means is for: receiving, from the remote device via an RTP header extension message, another UL MaxPLR indication to include information for the media RTP stream delivered from the remote device to the apparatus, wherein the other UL MaxPLR indication is based on the signaled UL MaxPLR indication, and transmitting a request to the local eNB to adjust an SRVCC HO threshold of a DL radio connection based on a UL MaxPLR value in the other UL MaxPLR indication.

Example 39 may include the apparatus of Example 38 or some other example herein, wherein the other UL MaxPLR indication is to indicate a maximum tolerable packet loss ratio value for a UL radio connection from the remote device to a remote eNB above which an SRVCC HO is to be activated.

Example 40 may include the apparatus of Example 38 or some other example herein, wherein the UL MaxPLR indication is to indicate a ratio of a maximum tolerable packet loss ratio value for the UL radio connection from the remote device to the remote eNB above which an SRVCC HO is to be activated and a maximum tolerable packet loss ratio value for the DL radio connection from the apparatus and the local eNB above which SRVCC handover is to be activated.

Example 41 may include the apparatus of Example 38 or some other example herein, wherein the other UL MaxPLR indication in the RTP header extension message is determined by the remote device to be a PLR to serve as the SRVCC HO threshold value for the UL connection from the remote device to the remote eNB based on an assessment of radio conditions between the remote device to the remote eNB.

Example 42 may include the apparatus of Example 38 or some other example herein, wherein the communication means are for receiving an SDP offer message from the remote device, wherein the SDP offer message is to include an extension map attribute that is associated with a 3GPP ul-plr parameter, wherein the ul-plr parameter is to indicate that the remote device supports transmission of uplink MaxPLR information signaled via RTP header extension messages.

Example 43 may include the apparatus of Example 42 or some other example herein, wherein the communication means are for transmitting an SDP answer message to the remote device, wherein the SDP answer message is to include an extension map attribute that is associated with the 3GPP ul-plr parameter, wherein the ul-plr parameter is to acknowledge that the apparatus supports reception of uplink MaxPLR information signaled via RTP header extension messages.

Example 44 may include the apparatus of Example 38 or some other example herein, wherein the RTP header extension message is to include a descriptor that includes the other UL MaxPLR information.

Example 45 may include the apparatus of Example 38 or some other example herein, wherein the SRVCC HO threshold for the DL connection between (1) the apparatus and the local eNB is adjusted based on a difference between an assessment of how much end-to-end MaxPLR the apparatus can tolerate during media reception from the remote device based on negotiated codec modes and jitter buffer management and packet loss concealment capabilities, and (2) UL MaxPLR value in the received RTP header extension message from the remote UE.

Example 46 may include the apparatus of Example 31-45 or some other example herein, wherein: the communication means is for transmitting an RTP header extension message, wherein the RTP header extension message is to include a downlink (DL) maximum packet loss ratio (MaxPLR) indication for the media RTP stream to be delivered by the communication means to the remote device, and wherein the signaled downlink MaxPLR indication is for the remote device to request from a remote eNB to adjust the SRVCC handover threshold of a remote device DL and/or UL connection based on the downlink MaxPLR value.

Example 47 may include the apparatus of Example 46 or some other example herein, wherein the communication means is for receiving a maximum end-to-end PLR of the remote device during a capability negotiation using session description protocol (SDP).

Example 48 may include the apparatus of Example 46 or some other example herein, wherein the DL MaxPLR indication pertains to a maximum tolerable packet loss ratio value for the DL radio connection between the remote UE to its local eNB above which SRVCC handover must be activated.

Example 49 may include the apparatus of Example 46 or some other example herein, wherein the DL MaxPLR indication pertains to a ratio of a maximum tolerable packet loss ratio value for the UL radio connection from the remote device to the remote eNB above which an SRVCC handover is to be activated and a maximum tolerable packet loss ratio value for the DL radio connection from the apparatus and the local eNB above which an SRVCC handover is to be activated.

Example 50 may include the apparatus of Example 46 or some other example herein, wherein the communication means is for receiving an SDP offer message from the remote device, the SDP offer message to include an extension map attribute that is associated with a 3GPP dl-plr parameter, the dl-plr parameter indicating that the remote device supports reception of DL MaxPLR information signaled via RTP header extension messages.

Example 51 may include the apparatus of Example 46 or some other example herein, wherein the communication means is for transmitting an SDP answer message to the remote device, the SDP answer message to include an extension map attribute that is associated with a 3GPP dl-plr parameter, the dl-plr parameter to acknowledge that the apparatus supports transmission of DL MaxPLR information signaled via RTP header extension messages.

Example 52 may include the apparatus of Example 46 or some other example herein, wherein the RTP header extension message is to include a descriptor that includes DL MaxPLR information.

Example 53 may include the apparatus of Example 46 or some other example herein, wherein the RTP header extension message is to include a descriptor that includes a ratio between UL MaxPLR and DL MaxPLR information.

Example 54 may include the apparatus of Example 46 or some other example herein, wherein the DL MaxPLR information is determined based on the difference between an end-to-end MaxPLR that the remote device can tolerate during media reception from the apparatus based on negotiated codec modes and a jitter buffer management and packet loss concealment capabilities, and a packet loss ratio to serve as the SRVCC handover threshold value for a local UL connection of the apparatus, which is based on an assessment of radio conditions between the apparatus and the local eNB, wherein the communication means is for receiving the difference from the remote device.

Example 55 may include the apparatus of Examples 31-45 or some other example herein, wherein the apparatus is implemented in or by a user equipment (UE) and the device is another UE.

Example 56: An apparatus of a user equipment (UE), comprising: circuitry to enable the UE to perform multimedia telephony with a remote UE, the multimedia telephony including a media real-time transport protocol (RTP) stream delivered from the remote UE to the local UE; and one or more processors to generate a real-time transport control protocol (RTCP) feedback message to be transmitted to the remote UE, the RTCP feedback message including an indication of an uplink (UL) maximum packet loss ratio (MaxPLR) for the media RTP stream, the indication of the UL MaxPLR to enable the remote UE to request that a cellular base station servicing the remote UE adjust, based on the indicated UL MaxPLR value, a single radio voice call continuity (SRVCC) handover threshold of a remote UL between the remote UE and the cellular base station servicing the remote UE.

Example 57: The apparatus of Example 56, wherein the UL MaxPLR value comprises a maximum tolerable packet loss ratio (PLR) value for the remote UL.

Example 58: The apparatus according to any one of Examples 56 and 57, wherein the UL MaxPLR value comprises a ratio of a maximum tolerable PLR value for the remote UL to a maximum tolerable PLR value for a local downlink (DL) between a cellular base station servicing the UE and the UE.

Example 59: The apparatus according to any one of Examples 56-58, wherein the one or more processors are further configured to decode a session description protocol (SDP) offer message received from the remote UE, the SDP offer message configured to indicate that the remote UE supports reception of UL MaxPLR information signaled via RTCP feedback messages.

Example 60: The apparatus according to any one of Examples 56-59, wherein the one or more processors are further configured to generate a session description protocol (SDP) answer message to be transmitted to the remote UE, the SDP answer message configured to indicate that the UE supports transmission of UL MaxPLR information signaled via RTCP feedback messages.

Example 61: The apparatus according to any one of Examples 56-60, wherein the one or more processors are further configured to: decode an RTP header extension message recieved from the remote UE, the RTP header extension message configured to indicate UL MaxPLR information for the media RTP stream; and generate a request to be transmitted to a cellular base station servicing the UE, the request configured to request that the cellular base station servicing the UE adjust an SRVCC handover threshold of its downlink (DL) connection with the UE based on the received UL MaxPLR information.

Example 62: An apparatus of a user equipment (UE), comprising: circuitry to enable the UE to perform multimedia telephony with a remote UE, the multimedia telephony including a media real-time transport protocol (RTP) stream delivered from the UE to the remote UE; and one or more processors to generate an RTP header extension message to be transmitted to the remote UE, the RTP header extension message including an indication of a downlink (DL) maximum packet loss ratio (MaxPLR) for the media RTP stream, the indication of the DL MaxPLR to enable the remote UE to request that a cellular base station servicing the remote UE adjust, based on the DL MaxPLR value, a single radio voice call continuity (SRVCC) handover threshold of a remote DL between a cellular base station servicing the remote UE and the remote UE.

Example 63: The apparatus of Example 62, wherein the one or more processors are further configured to decode a message received from the remote UE during a capability negotiation using a session description protocol (SDP), the message indicating a maximum end-to-end packet loss ratio (PLR) of the remote UE.

Example 64: The apparatus according to any one of Examples 62 and 63, wherein the DL MaxPLR information is determined based on a difference between: an assessment by the remote UE of how much end-to-end MaxPLR the remote UE can tolerate during media reception from the UE based on negotiated codec modes, jitter buffer management, and packet loss concealment capabilities of the remote UE, and a packet loss ratio to serve as an SRVCC handover threshold value for a local uplink (UL) between the UE and a cellular base station servicing the UE, considering radio conditions between the UE and the cellular base station servicing the UE.

Example 65: The apparatus according to any one of Examples 62-64, wherein the one or more processors are configured to decode a session description protocol (SDP) offer message received from the remote UE, the SDP offer message configured to indicate that the remote UE supports reception of DL MaxPLR information signaled via RTP header extension messages.

Example 66: The apparatus according to any one of Examples 62-65, wherein the one or more processors are further configured to generate a session description protocol (SDP) answer message to be transmitted to the remote UE, the SDP answer message configured to indicate that the UE supports transmission of DL MaxPLR information signaled via RTP header extension messages.

Example 67: The apparatus according to any one of Examples 62-66, wherein the RTP header extension message includes a ratio between an uplink (UL) MaxPLR and the DL MaxPLR.

Example 68 may include an apparatus comprising means to perform one or more elements of a method described in or related to any of Examples 1-67, or any other method or process described herein.

Example 69 may include one or more non-transitory computer-readable media comprising instructions to cause an electronic device, upon execution of the instructions by one or more processors of the electronic device, to perform one or more elements of a method described in or related to any of Examples 1-67, or any other method or process described herein.

Example 70 may include an apparatus comprising logic, modules, or circuitry to perform one or more elements of a method described in or related to any of Examples 1-67, or any other method or process described herein.

Example 71 may include a method, technique, or process as described in or related to any of Examples 1-67, or portions or parts thereof.

Example 72 may include an apparatus comprising: one or more processors and one or more computer readable media comprising instructions that, when executed by the one or more processors, cause the one or more processors to perform the method, techniques, or process as described in or related to any of Examples 1-67, or portions thereof.

Example 73 may include a signal as described in or related to any of Examples 1-67, or portions or parts thereof.

Example 74 may include a signal in a wireless network as shown and described herein.

Example 75 may include a method of communicating in a wireless network as shown and described herein.

Example 76 may include a system for providing wireless communication as shown and described herein.

Example 77 may include a device for providing wireless communication as shown and described herein.

Cellular Communication System Implementation

Figure 18:
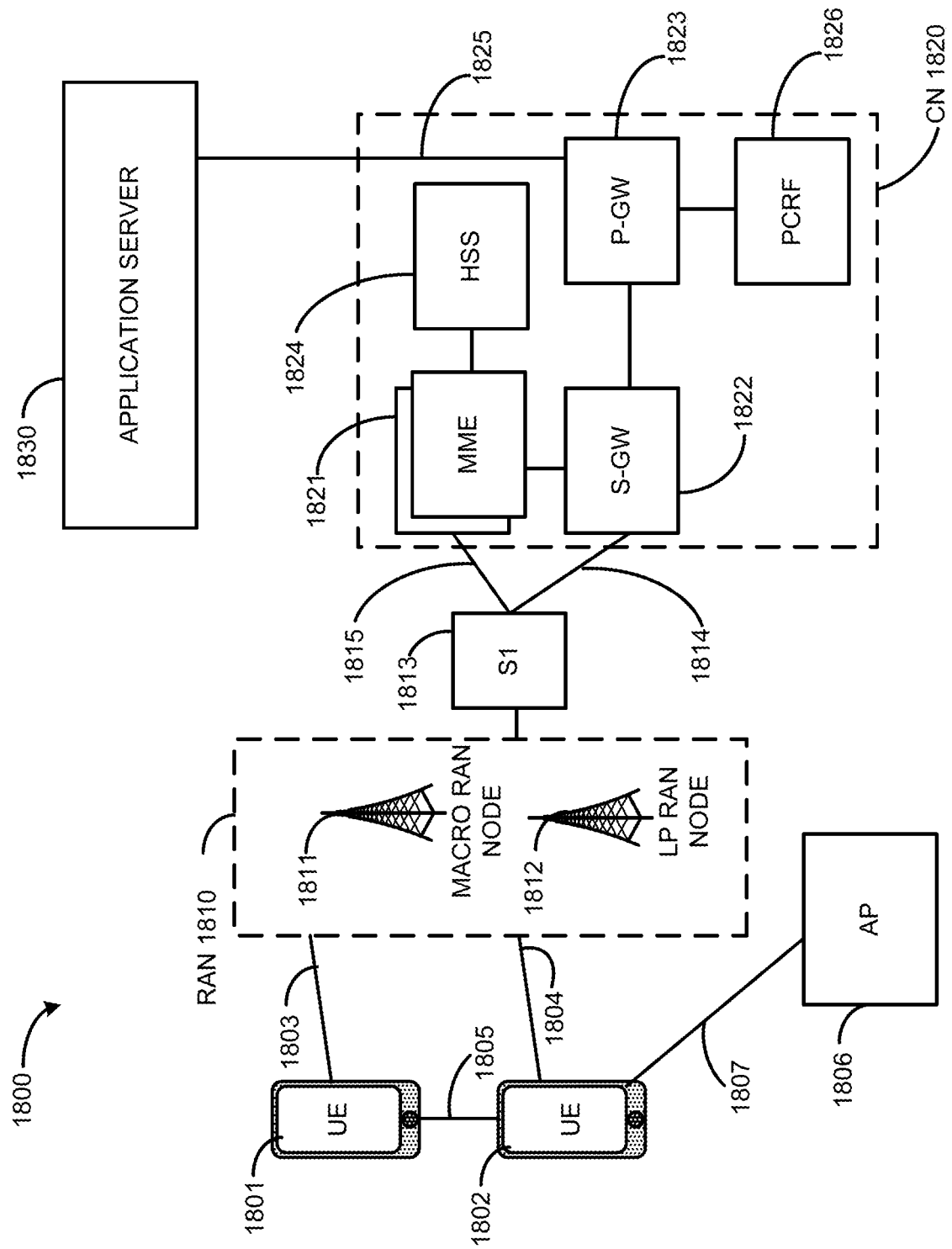
FIG. 18 illustrates an architecture of a system of a network in accordance with some embodiments.

FIG. 18 illustrates an architecture of a system 1800 of a network in accordance with some embodiments. The system 1800 is shown to include a user equipment (UE) 1801 and a UE 1802. The UEs 1801 and 1802 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1801 and 1802 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1801 and 1802 may be configured to connect, e.g., communicatively couple, with a radio access network (RAN) 1810. The RAN 1810 may be, for example, an Evolved Universal Mobile Telecommunications System (UMTS) Terrestrial Radio Access Network (E-UTRAN), a NextGen RAN (NG RAN), or some other type of RAN. The UEs 1801 and 1802 utilize connections 1803 and 1804, respectively, each of which comprises a physical communications interface or layer (discussed in further detail below); in this example, the connections 1803 and 1804 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1801 and 1802 may further directly exchange communication data via a ProSe interface 1805. The ProSe interface 1805 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1802 is shown to be configured to access an access point (AP) 1806 via connection 1807. The connection 1807 can comprise a local wireless connection, such as a connection consistent with any IEEE 802.11 protocol, wherein the AP 1806 would comprise a wireless fidelity (WiFi®) router. In this example, the AP 1806 may be connected to the Internet without connecting to the core network of the wireless system (described in further detail below).

The RAN 1810 can include one or more access nodes that enable the connections 1803 and 1804. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1810 may include one or more RAN nodes for providing macrocells, e.g., macro RAN node 1811, and one or more RAN nodes for providing femtocells or picocells (e.g., cells having smaller coverage areas, smaller user capacity, or higher bandwidth compared to macrocells), e.g., low power (LP) RAN node 1812.

Any of the RAN nodes 1811 and 1812 can terminate the air interface protocol and can be the first point of contact for the UEs 1801 and 1802. In some embodiments, any of the RAN nodes 1811 and 1812 can fulfill various logical functions for the RAN 1810 including, but not limited to, radio network controller (RNC) functions such as radio bearer management, uplink and downlink dynamic radio resource management and data packet scheduling, and mobility management.

In accordance with some embodiments, the UEs 1801 and 1802 can be configured to communicate using Orthogonal Frequency-Division Multiplexing (OFDM) communication signals with each other or with any of the RAN nodes 1811 and 1812 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1811 and 1812 to the UEs 1801 and 1802, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1801 and 1802. The physical downlink control channel (PDCCH) may carry information about the transport format and resource allocations related to the PDSCH channel, among other things. It may also inform the UEs 1801 and 1802 about the transport format, resource allocation, and H-ARQ (Hybrid Automatic Repeat Request) information related to the uplink shared channel. Typically, downlink scheduling (assigning control and shared channel resource blocks to the UE 1802 within a cell) may be performed at any of the RAN nodes 1811 and 1812 based on channel quality information fed back from any of the UEs 1801 and 1802. The downlink resource assignment information may be sent on the PDCCH used for (e.g., assigned to) each of the UEs 1801 and 1802.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, $L=1$, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1810 is shown to be communicatively coupled to a core network (CN) 1820—via an S1 interface 1813. In embodiments, the CN 1820 may be an evolved packet core (EPC) network, a NextGen Packet Core (NPC) network, or some other type of CN. In this embodiment the S1 interface 1813 is split into two parts: the S1-U interface 1814, which carries traffic data between the RAN nodes 1811 and 1812 and a serving gateway (S-GW) 1822, and an S1-mobility management entity (MME) interface 1815, which is a signaling interface between the RAN nodes 1811 and 1812 and MMEs 1821.

In this embodiment, the CN 1820 comprises the MMEs 1821, the S-GW 1822, a Packet Data Network (PDN) Gateway (P-GW) 1823, and a home subscriber server (HSS) 1824. The MMEs 1821 may be similar in function to the control plane of legacy Serving General Packet Radio Service (GPRS) Support Nodes (SGSN). The MMEs 1821 may manage mobility aspects in access such as gateway selection and tracking area list management. The HSS 1824 may comprise a database for network users, including subscription-related information to support the network entities' handling of communication sessions. The CN 1820 may comprise one or several HSSs 1824, depending on the number of mobile subscribers, on the capacity of the equipment, on the organization of the network, etc. For example, the HSS 1824 can provide support for routing/roaming, authentication, authorization, naming/addressing resolution, location dependencies, etc.

The S-GW 1822 may terminate the S1 interface 1813 towards the RAN 1810, and routes data packets between the RAN 1810 and the CN 1820. In addition, the S-GW 1822 may be a local mobility anchor point for inter-RAN node handovers and also may provide an anchor for inter-3GPP mobility. Other responsibilities may include lawful intercept, charging, and some policy enforcement.

The P-GW 1823 may terminate an SGi interface toward a PDN. The P-GW 1823 may route data packets between the CN 1820 (e.g., an EPC network) and external networks such as a network including the application server 1830 (alternatively referred to as application function (AF)) via an Internet Protocol (IP) interface 1825. Generally, an application server 1830 may be an element offering applications that use IP bearer resources with the core network (e.g., UMTS Packet Services (PS) domain, LTE PS data services, etc.). In this embodiment, the P-GW 1823 is shown to be communicatively coupled to an application server 1830 via an IP communications interface 1825. The application server 1830 can also be configured to support one or more communication services (e.g., Voice-over-Internet Protocol (VoIP) sessions, PTT sessions, group communication sessions, social networking services, etc.) for the UEs 1801 and 1802 via the CN 1820.

The P-GW 1823 may further be a node for policy enforcement and charging data collection. A Policy and Charging Enforcement Function (PCRF) 1826 is the policy and charging control element of the CN 1820. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1826 may be communicatively coupled to the application server 1830 via the P-GW 1823. The application server 1830 may signal the PCRF 1826 to indicate a new service flow and select the appropriate Quality of Service (QoS) and charging parameters. The PCRF 1826 may provision this rule into a Policy and Charging Enforcement Function (PCEF) (not shown) with the appropriate traffic flow template (TFT) and QoS class of identifier (QCI), which commences the QoS and charging as specified by the application server 1830.

Figure 19:
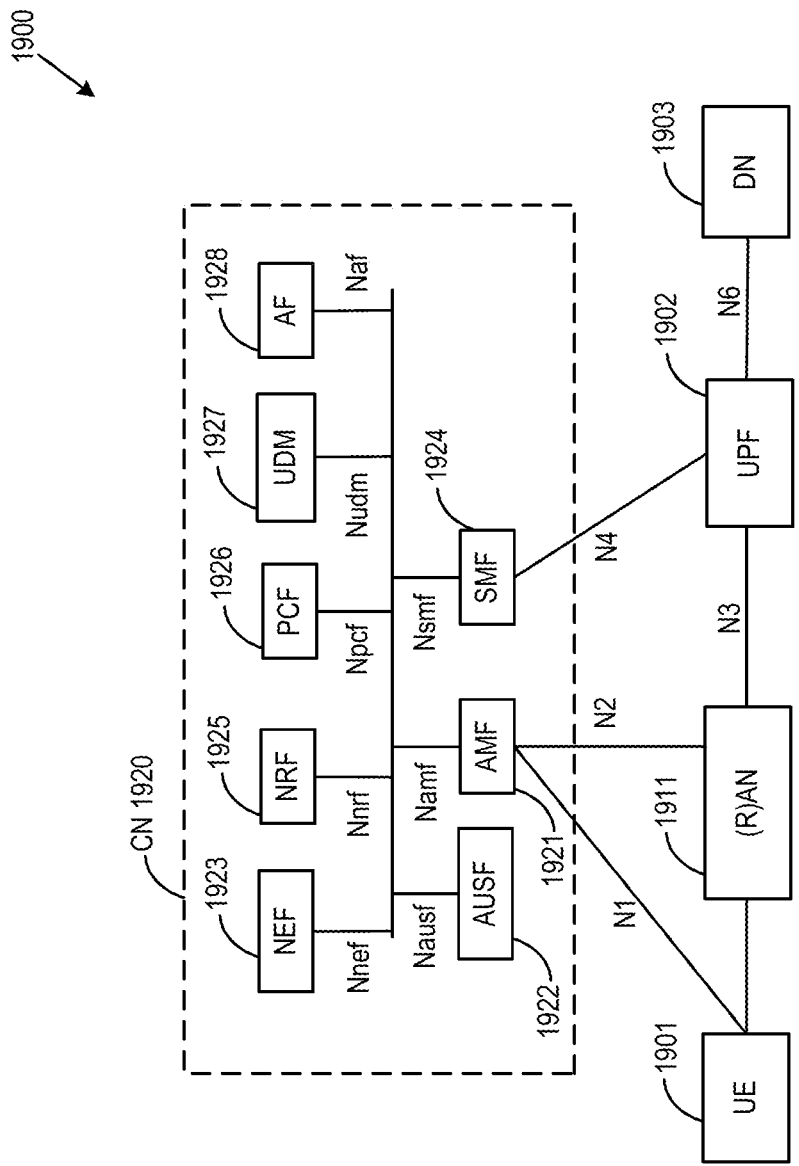
FIG. 19 illustrates an architecture of a system of a network in accordance with some embodiments.

FIG. 19 illustrates an architecture of a system 1900 of a network in accordance with some embodiments. The system 1900 is shown to include a UE 1901, which may be the same or similar to UEs 1801 and 1802 discussed previously; a RAN node 1911, which may be the same or similar to RAN nodes 1811 and 1812 discussed previously; a User Plane Function (UPF) 1902; a Data network (DN) 1903, which may be, for example, operator services, Internet access or 3rd party services; and a 5G Core Network (5GC or CN) 1920.

The CN 1920 may include an Authentication Server Function (AUSF) 1922; a Core Access and Mobility Management Function (AMF) 1921; a Session Management Function (SMF) 1924; a Network Exposure Function (NEF) 1923; a Policy Control Function (PCF) 1926; a Network Function (NF) Repository Function (NRF) 1925; a Unified Data Management (UDM) 1927; and an Application Function (AF) 1928. The CN 1920 may also include other elements that are not shown, such as a Structured Data Storage network function (SDSF), an Unstructured Data Storage network function (UDSF), and the like.

The UPF 1902 may act as an anchor point for intra-RAT and inter-RAT mobility, an external PDU session point of interconnect to DN 1903, and a branching point to support multi-homed PDU session. The UPF 1902 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1902 may include an uplink classifier to support routing traffic flows to a data network. The DN 1903 may represent various network operator services, Internet access, or third party services. NY 1903 may include, or be similar to application server 1830 discussed previously.

The AUSF 1922 may store data for authentication of UE 1901 and handle authentication related functionality. The AUSF 1922 may facilitate a common authentication framework for various access types.

The AMF 1921 may be responsible for registration management (e.g., for registering UE 1901, etc.), connection management, reachability management, mobility management, and lawful interception of AMF-related events, and access authentication and authorization. AMF 1921 may provide transport for SM messages between and SMF 1924, and act as a transparent proxy for routing SM messages. AMF 1921 may also provide transport for short message service (SMS) messages between UE 1901 and an SMS function (SMSF) (not shown by FIG. 19). AMF 1921 may act as Security Anchor Function (SEA), which may include interaction with the AUSF 1922 and the UE 1901, receipt of an intermediate key that was established as a result of the UE 1901 authentication process. Where USIM based authentication is used, the AMF 1921 may retrieve the security material from the AUSF 1922. AMF 1921 may also include a Security Context Management (SCM) function, which receives a key from the SEA that it uses to derive access-network specific keys. Furthermore, AMF 1921 may be a termination point of RAN CP interface (N2 reference point), a termination point of NAS (N1) signaling, and perform NAS ciphering and integrity protection.

AMF 1921 may also support NAS signaling with a UE 1901 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (N1) signaling between the UE 1901 and AMF 1921, and relay uplink and downlink user-plane packets between the UE 1901 and UPF 1902. The N3IWF also provides mechanisms for IPsec tunnel establishment with the UE 1901.

The SMF 1924 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 1924 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 1923 may provide means for securely exposing the services and capabilities provided by 3GPP network functions for third party, internal exposure/re-exposure, Application Functions (e.g., AF 1928), edge computing or fog computing systems, etc. In such embodiments, the NEF 1923 may authenticate, authorize, and/or throttle the AFs. NEF 1923 may also translate information exchanged with the AF 1928 and information exchanged with internal network functions. For example, the NEF 1923 may translate between an AF-Service-Identifier and an internal 5GC information. NEF 1923 may also receive information from other network functions (NFs) based on exposed capabilities of other network functions. This information may be stored at the NEF 1923 as structured data, or at a data storage NF using a standardized interfaces. The stored information can then be re-exposed by the NEF 1923 to other NFs and AFs, and/or used for other purposes such as analytics.

The NRF 1925 may support service discovery functions, receive NF Discovery Requests from NF instances, and provide the information of the discovered NF instances to the NF instances. NRF 1925 also maintains information of available NF instances and their supported services.

The PCF 1926 may provide policy rules to control plane function(s) to enforce them, and may also support unified policy framework to govern network behavior. The PCF 1926 may also implement a front end (FE) to access subscription information relevant for policy decisions in a UDR of UDM 1927.

The UDM 1927 may handle subscription-related information to support the network entities' handling of communication sessions, and may store subscription data of UE 1901. The UDM 1927 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 1926. UDM 1927 may also support SMS management, wherein an SMS-FE implements the similar application logic as discussed previously.

The AF 1928 may provide application influence on traffic routing, access to the Network Capability Exposure (NCE), and interact with the policy framework for policy control. The NCE may be a mechanism that allows the 5GC and AF 1928 to provide information to each other via NEF 1923, which may be used for edge computing implementations. In such implementations, the network operator and third party services may be hosted close to the UE 1901 access point of attachment to achieve an efficient service delivery through the reduced end-to-end latency and load on the transport network. For edge computing implementations, the 5GC may select a UPF 1902 close to the UE 1901 and execute traffic steering from the UPF 1902 to DN 1903 via the N6 interface. This may be based on the UE subscription data, UE location, and information provided by the AF 1928. In this way, the AF 1928 may influence UPF (re)selection and traffic routing. Based on operator deployment, when AF 1928 is considered to be a trusted entity, the network operator may permit AF 1928 to interact directly with relevant NFs.

As discussed previously, the CN 1920 may include an SMSF, which may be responsible for SMS subscription checking and verification, and relaying SM messages to/from the UE 1901 to/from other entities, such as an SMS-GMSC/IWMSC/SMS-router. The SMS may also interact with AMF 1921 and UDM 1927 for notification procedure that the UE 1901 is available for SMS transfer (e.g., set a UE not reachable flag, and notifying UDM 1927 when UE 1901 is available for SMS).

The system 1900 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 1900 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 1920 may include an Nx interface, which is an inter-CN interface between the MME (e.g., MME 1821) and the AMF 1921 in order to enable interworking between CN 1920 and CN 1820.

Although not shown by FIG. 19, system 1900 may include multiple RAN nodes 1911 wherein an Xn interface is defined between two or more RAN nodes 1911 (e.g., gNBs and the like) that connecting to 5GC 1920, between a RAN node 1911 (e.g., gNB) connecting to 5GC 1920 and an eNB (e.g., a RAN node 1811 of FIG. 18), and/or between two eNBs connecting to 5GC 1920.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1901 in a connected mode (e.g., CM-CONNECTED) including functionality to manage the UE mobility for connected mode between one or more RAN nodes 1911. The mobility support may include context transfer from an old (source) serving RAN node 1911 to new (target) serving RAN node 1911; and control of user plane tunnels between old (source) serving RAN node 1911 to new (target) serving RAN node 1911.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 20:
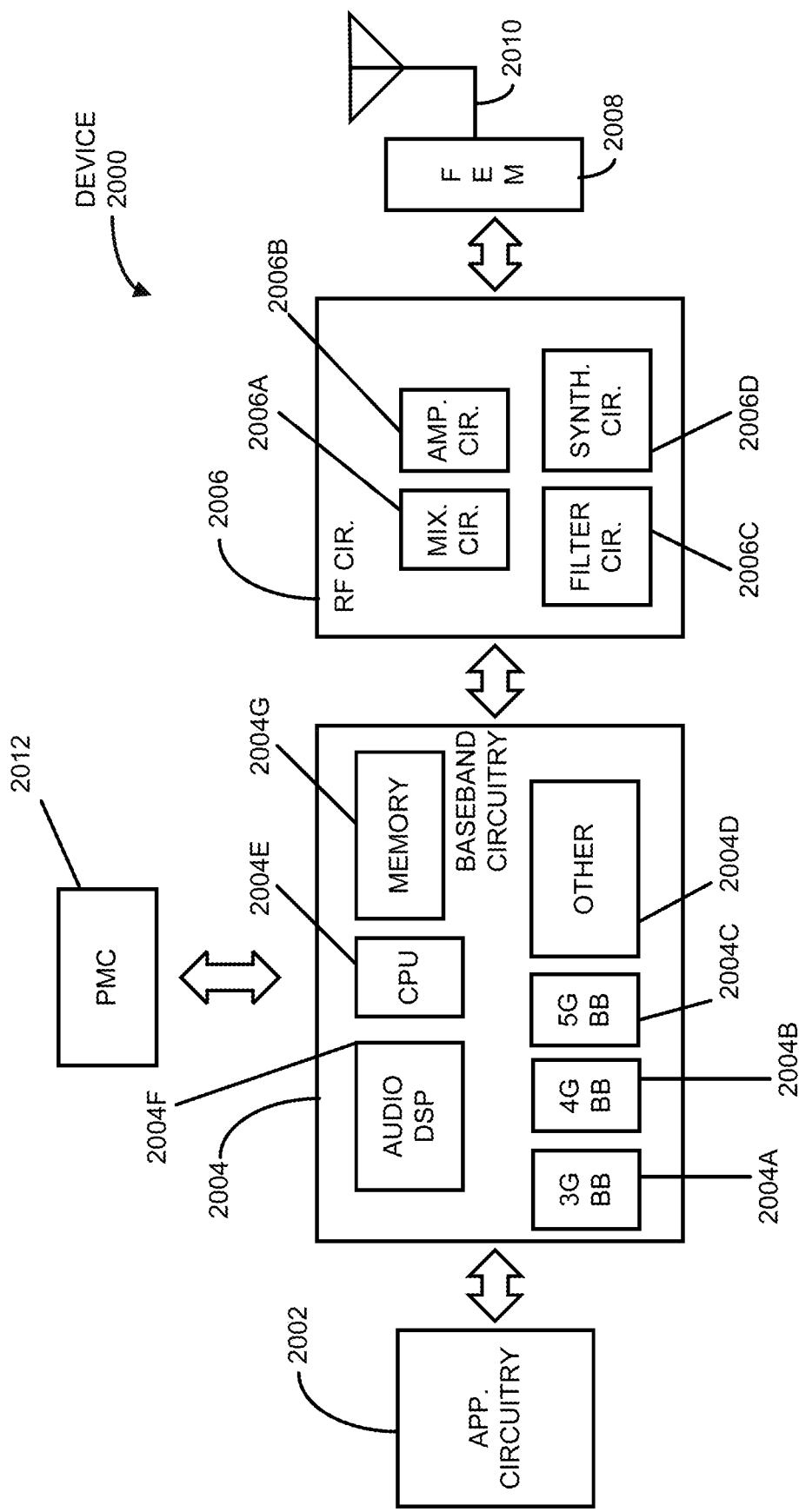
FIG. 20 illustrates example components of a device in accordance with some embodiments.

FIG. 20 illustrates example components of a device 2000 in accordance with some embodiments. In some embodiments, the device 2000 may include application circuitry 2002, baseband circuitry 2004, Radio Frequency (RF) circuitry 2006, front-end module (FEM) circuitry 2008, one or more antennas 2010, and power management circuitry (PMC) 2012 coupled together at least as shown. The components of the illustrated device 2000 may be included in a UE or a RAN node. In some embodiments, the device 2000 may include fewer elements (e.g., a RAN node may not utilize application circuitry 2002, and instead include a processor/controller to process IP data received from an EPC). In some embodiments, the device 2000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2002 may include one or more application processors. For example, the application circuitry 2002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2000. In some embodiments, processors of application circuitry 2002 may process IP data packets received from an EPC.

The baseband circuitry 2004 may include circuitry such as, but not limited to, one or more single-core or multi-core processors. The baseband circuitry 2004 may include one or more baseband processors or control logic to process baseband signals received from a receive signal path of the RF circuitry 2006 and to generate baseband signals for a transmit signal path of the RF circuitry 2006. Baseband processing circuity 2004 may interface with the application circuitry 2002 for generation and processing of the baseband signals and for controlling operations of the RF circuitry 2006. For example, in some embodiments, the baseband circuitry 2004 may include a third generation (3G) baseband processor 2004A, a fourth generation (4G) baseband processor 2004B, a fifth generation (5G) baseband processor 2004C, or other baseband processor(s) 2004D for other existing generations, generations in development or to be developed in the future (e.g., second generation (2G), sixth generation (6G), etc.). The baseband circuitry 2004 (e.g., one or more of baseband processors 2004A-D) may handle various radio control functions that enable communication with one or more radio networks via the RF circuitry 2006. In other embodiments, some or all of the functionality of baseband processors 2004A-D may be included in modules stored in the memory 2004G and executed via a Central Processing Unit (CPU) 2004E. The radio control functions may include, but are not limited to, signal modulation/demodulation, encoding/decoding, radio frequency shifting, etc. In some embodiments, modulation/demodulation circuitry of the baseband circuitry 2004 may include Fast-Fourier Transform (FFT), precoding, or constellation mapping/demapping functionality. In some embodiments, encoding/decoding circuitry of the baseband circuitry 2004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2004 may include one or more audio digital signal processor(s) (DSP) 2004F. The audio DSP(s) 2004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2004 and the application circuitry 2002 may be implemented together such as, for example, on a system on a chip (SOC).

In some embodiments, the baseband circuitry 2004 may provide for communication compatible with one or more radio technologies. For example, in some embodiments, the baseband circuitry 2004 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 2004 is configured to support radio communications of more than one wireless protocol may be referred to as multi-mode baseband circuitry.

RF circuitry 2006 may enable communication with wireless networks using modulated electromagnetic radiation through a non-solid medium. In various embodiments, the RF circuitry 2006 may include switches, filters, amplifiers, etc. to facilitate the communication with the wireless network. The RF circuitry 2006 may include a receive signal path which may include circuitry to down-convert RF signals received from the FEM circuitry 2008 and provide baseband signals to the baseband circuitry 2004. RF circuitry 2006 may also include a transmit signal path which may include circuitry to up-convert baseband signals provided by the baseband circuitry 2004 and provide RF output signals to the FEM circuitry 2008 for transmission.

In some embodiments, the receive signal path of the RF circuitry 2006 may include mixer circuitry 2006A, amplifier circuitry 2006B and filter circuitry 2006C. In some embodiments, the transmit signal path of the RF circuitry 2006 may include filter circuitry 2006C and mixer circuitry 2006A. RF circuitry 2006 may also include synthesizer circuitry 2006D for synthesizing a frequency for use by the mixer circuitry 2006A of the receive signal path and the transmit signal path. In some embodiments, the mixer circuitry 2006A of the receive signal path may be configured to down-convert RF signals received from the FEM circuitry 2008 based on the synthesized frequency provided by synthesizer circuitry 2006D. The amplifier circuitry 2006B may be configured to amplify the down-converted signals and the filter circuitry 2006C may be a low-pass filter (LPF) or band-pass filter (BPF) configured to remove unwanted signals from the down-converted signals to generate output baseband signals. Output baseband signals may be provided to the baseband circuitry 2004 for further processing. In some embodiments, the output baseband signals may be zero-frequency baseband signals, although this is not a requirement. In some embodiments, the mixer circuitry 2006A of the receive signal path may comprise passive mixers, although the scope of the embodiments is not limited in this respect.

In some embodiments, the mixer circuitry 2006A of the transmit signal path may be configured to up-convert input baseband signals based on the synthesized frequency provided by the synthesizer circuitry 2006D to generate RF output signals for the FEM circuitry 2008. The baseband signals may be provided by the baseband circuitry 2004 and may be filtered by the filter circuitry 2006C.

In some embodiments, the mixer circuitry 2006A of the receive signal path and the mixer circuitry 2006A of the transmit signal path may include two or more mixers and may be arranged for quadrature downconversion and upconversion, respectively. In some embodiments, the mixer circuitry 2006A of the receive signal path and the mixer circuitry 2006A of the transmit signal path may include two or more mixers and may be arranged for image rejection (e.g., Hartley image rejection). In some embodiments, the mixer circuitry 2006A of the receive signal path and the mixer circuitry 2006A may be arranged for direct downconversion and direct upconversion, respectively. In some embodiments, the mixer circuitry 2006A of the receive signal path and the mixer circuitry 2006A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2006 may include analog-to-digital converter (ADC) and digital-to-analog converter (DAC) circuitry and the baseband circuitry 2004 may include a digital baseband interface to communicate with the RF circuitry 2006.

In some dual-mode embodiments, a separate radio IC circuitry may be provided for processing signals for each spectrum, although the scope of the embodiments is not limited in this respect.

In some embodiments, the synthesizer circuitry 2006D may be a fractional-N synthesizer or a fractional N/N+1 synthesizer, although the scope of the embodiments is not limited in this respect as other types of frequency synthesizers may be suitable. For example, synthesizer circuitry 2006D may be a delta-sigma synthesizer, a frequency multiplier, or a synthesizer comprising a phase-locked loop with a frequency divider.

The synthesizer circuitry 2006D may be configured to synthesize an output frequency for use by the mixer circuitry 2006A of the RF circuitry 2006 based on a frequency input and a divider control input. In some embodiments, the synthesizer circuitry 2006D may be a fractional N/N+1 synthesizer.

In some embodiments, frequency input may be provided by a voltage controlled oscillator (VCO), although that is not a requirement. Divider control input may be provided by either the baseband circuitry 2004 or the application circuitry 2002 (such as an applications processor) depending on the desired output frequency. In some embodiments, a divider control input (e.g., N) may be determined from a look-up table based on a channel indicated by the application circuitry 2002.

Synthesizer circuitry 2006D of the RF circuitry 2006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 2006D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2006 may include an IQ/polar converter.

FEM circuitry 2008 may include a receive signal path which may include circuitry configured to operate on RF signals received from one or more antennas 2010, amplify the received signals and provide the amplified versions of the received signals to the RF circuitry 2006 for further processing. The FEM circuitry 2008 may also include a transmit signal path which may include circuitry configured to amplify signals for transmission provided by the RF circuitry 2006 for transmission by one or more of the one or more antennas 2010. In various embodiments, the amplification through the transmit or receive signal paths may be done solely in the RF circuitry 2006, solely in the FEM circuitry 2008, or in both the RF circuitry 2006 and the FEM circuitry 2008.

In some embodiments, the FEM circuitry 2008 may include a TX/RX switch to switch between transmit mode and receive mode operation. The FEM circuitry 2008 may include a receive signal path and a transmit signal path. The receive signal path of the FEM circuitry 2008 may include an LNA to amplify received RF signals and provide the amplified received RF signals as an output (e.g., to the RF circuitry 2006). The transmit signal path of the FEM circuitry 2008 may include a power amplifier (PA) to amplify input RF signals (e.g., provided by the RF circuitry 2006), and one or more filters to generate RF signals for subsequent transmission (e.g., by one or more of the one or more antennas 2010).

In some embodiments, the PMC 2012 may manage power provided to the baseband circuitry 2004. In particular, the PMC 2012 may control power-source selection, voltage scaling, battery charging, or DC-to-DC conversion. The PMC 2012 may often be included when the device 2000 is capable of being powered by a battery, for example, when the device 2000 is included in a UE. The PMC 2012 may increase the power conversion efficiency while providing desirable implementation size and heat dissipation characteristics.

FIG. 20 shows the PMC 2012 coupled only with the baseband circuitry 2004. However, in other embodiments, the PMC 2012 may be additionally or alternatively coupled with, and perform similar power management operations for, other components such as, but not limited to, the application circuitry 2002, the RF circuitry 2006, or the FEM circuitry 2008.

In some embodiments, the PMC 2012 may control, or otherwise be part of, various power saving mechanisms of the device 2000. For example, if the device 2000 is in an RRC_Connected state, where it is still connected to the RAN node as it expects to receive traffic shortly, then it may enter a state known as Discontinuous Reception Mode (DRX) after a period of inactivity. During this state, the device 2000 may power down for brief intervals of time and thus save power.

If there is no data traffic activity for an extended period of time, then the device 2000 may transition off to an RRC_Idle state, where it disconnects from the network and does not perform operations such as channel quality feedback, handover, etc. The device 2000 goes into a very low power state and it performs paging where again it periodically wakes up to listen to the network and then powers down again. The device 2000 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2002 and processors of the baseband circuitry 2004 may be used to execute elements of one or more instances of a protocol stack. For example, processors of the baseband circuitry 2004, alone or in combination, may be used to execute Layer 3, Layer 2, or Layer 1 functionality, while processors of the application circuitry 2002 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 21:
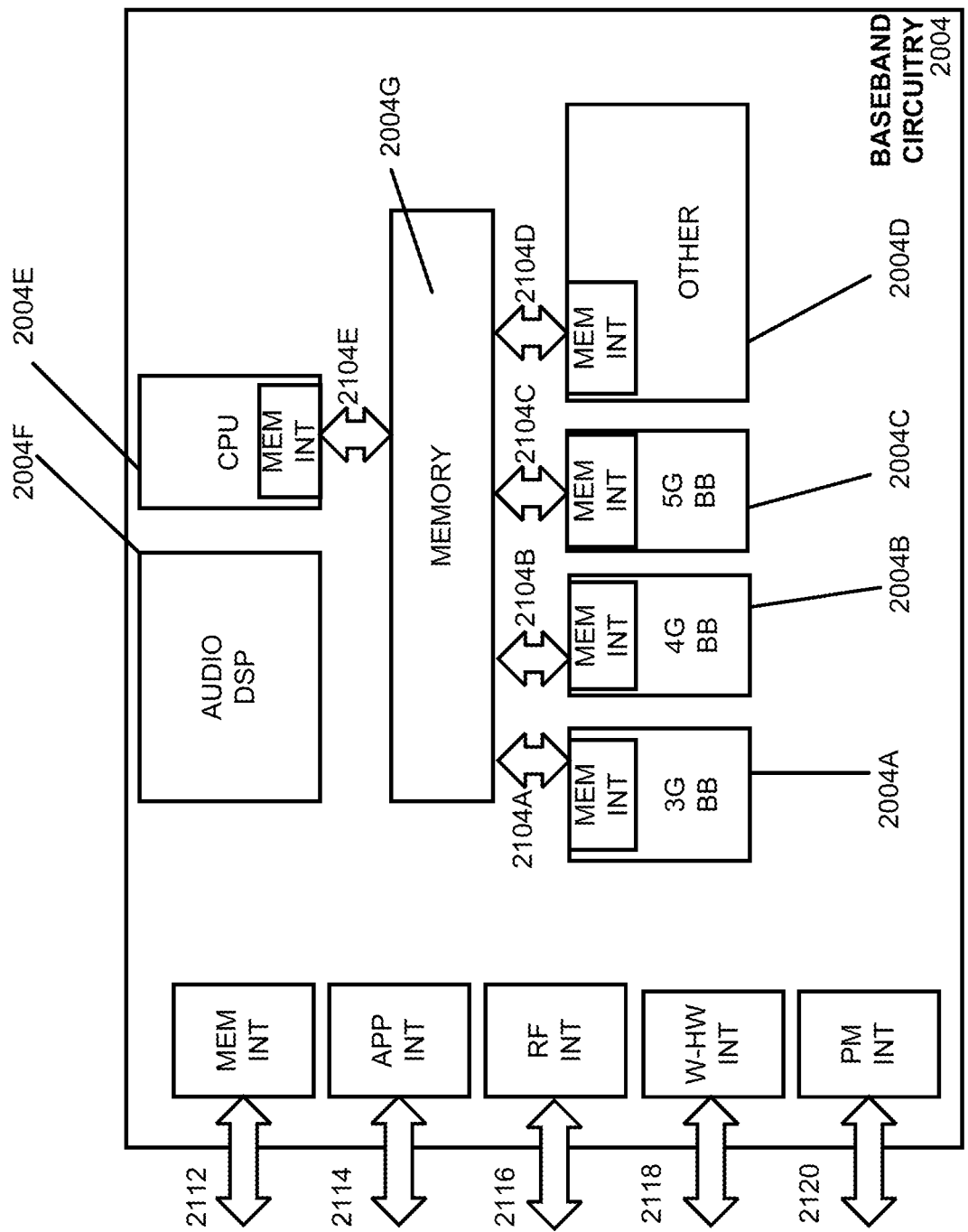
FIG. 21 illustrates example interfaces of baseband circuitry in accordance with some embodiments.

FIG. 21 illustrates example interfaces of baseband circuitry in accordance with some embodiments. As discussed above, the baseband circuitry 2004 of FIG. 20 may comprise processors 2004A-2004E and a memory 2004G utilized by said processors. Each of the processors 2004A-2004E may include a memory interface, 2104A-2104E, respectively, to send/receive data to/from the memory 2004G.

The baseband circuitry 2004 may further include one or more interfaces to communicatively couple to other circuitries/devices, such as a memory interface 2112 (e.g., an interface to send/receive data to/from memory external to the baseband circuitry 2004), an application circuitry interface 2114 (e.g., an interface to send/receive data to/from the application circuitry 2002 of FIG. 20), an RF circuitry interface 2116 (e.g., an interface to send/receive data to/from RF circuitry 2006 of FIG. 20), a wireless hardware connectivity interface 2118 (e.g., an interface to send/receive data to/from Near Field Communication (NFC) components, Bluetooth® components (e.g., Bluetooth® Low Energy), Wi-Fi® components, and other communication components), and a power management interface 2120 (e.g., an interface to send/receive power or control signals to/from the PMC 2012.

Figure 22:
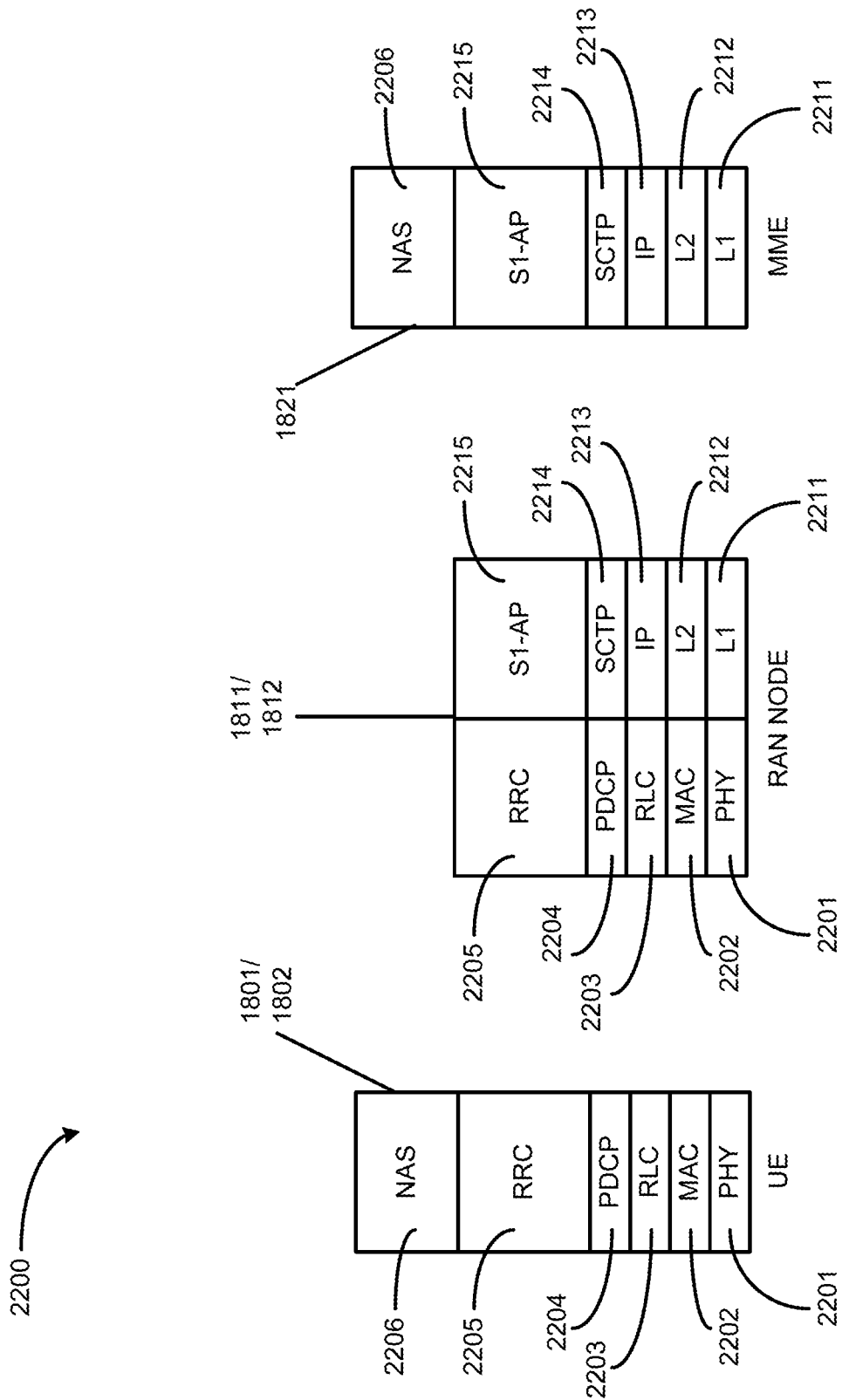
FIG. 22 is an illustration of a control plane protocol stack in accordance with some embodiments.

FIG. 22 is an illustration of a control plane protocol stack in accordance with some embodiments. In this embodiment, a control plane 2200 is shown as a communications protocol stack between the UE 1801 (or alternatively, the UE 1802), the RAN node 1811 (or alternatively, the RAN node 1812), and the MME 1821.

A PHY layer 2201 may transmit or receive information used by the MAC layer 2202 over one or more air interfaces. The PHY layer 2201 may further perform link adaptation or adaptive modulation and coding (AMC), power control, cell search (e.g., for initial synchronization and handover purposes), and other measurements used by higher layers, such as an RRC layer 2205. The PHY layer 2201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 2202 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

An RLC layer 2203 may operate in a plurality of modes of operation, including: Transparent Mode (TM), Unacknowledged Mode (UM), and Acknowledged Mode (AM). The RLC layer 2203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 2203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 2204 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 2205 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1801 and the RAN node 1811 may utilize a Uu interface (e.g., an LTE-Uu interface) to exchange control plane data via a protocol stack comprising the PHY layer 2201, the MAC layer 2202, the RLC layer 2203, the PDCP layer 2204, and the RRC layer 2205.

In the embodiment shown, the non-access stratum (NAS) protocols 2206 form the highest stratum of the control plane between the UE 1801 and the MME 1821. The NAS protocols 2206 support the mobility of the UE 1801 and the session management procedures to establish and maintain IP connectivity between the UE 1801 and the P-GW 1823.

The S1 Application Protocol (S1-AP) layer 2215 may support the functions of the S1 interface and comprise Elementary Procedures (EPs). An EP is a unit of interaction between the RAN node 1811 and the CN 1820. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 2214 may ensure reliable delivery of signaling messages between the RAN node 1811 and the MME 1821 based, in part, on the IP protocol, supported by an IP layer 2213. An L2 layer 2212 and an L1 layer 2211 may refer to communication links (e.g., wired or wireless) used by the RAN node and the MME to exchange information.

The RAN node 1811 and the MME 1821 may utilize an S1-MME interface to exchange control plane data via a protocol stack comprising the L1 layer 2211, the L2 layer 2212, the IP layer 2213, the SCTP layer 2214, and the S1-AP layer 2215.

Figure 23:
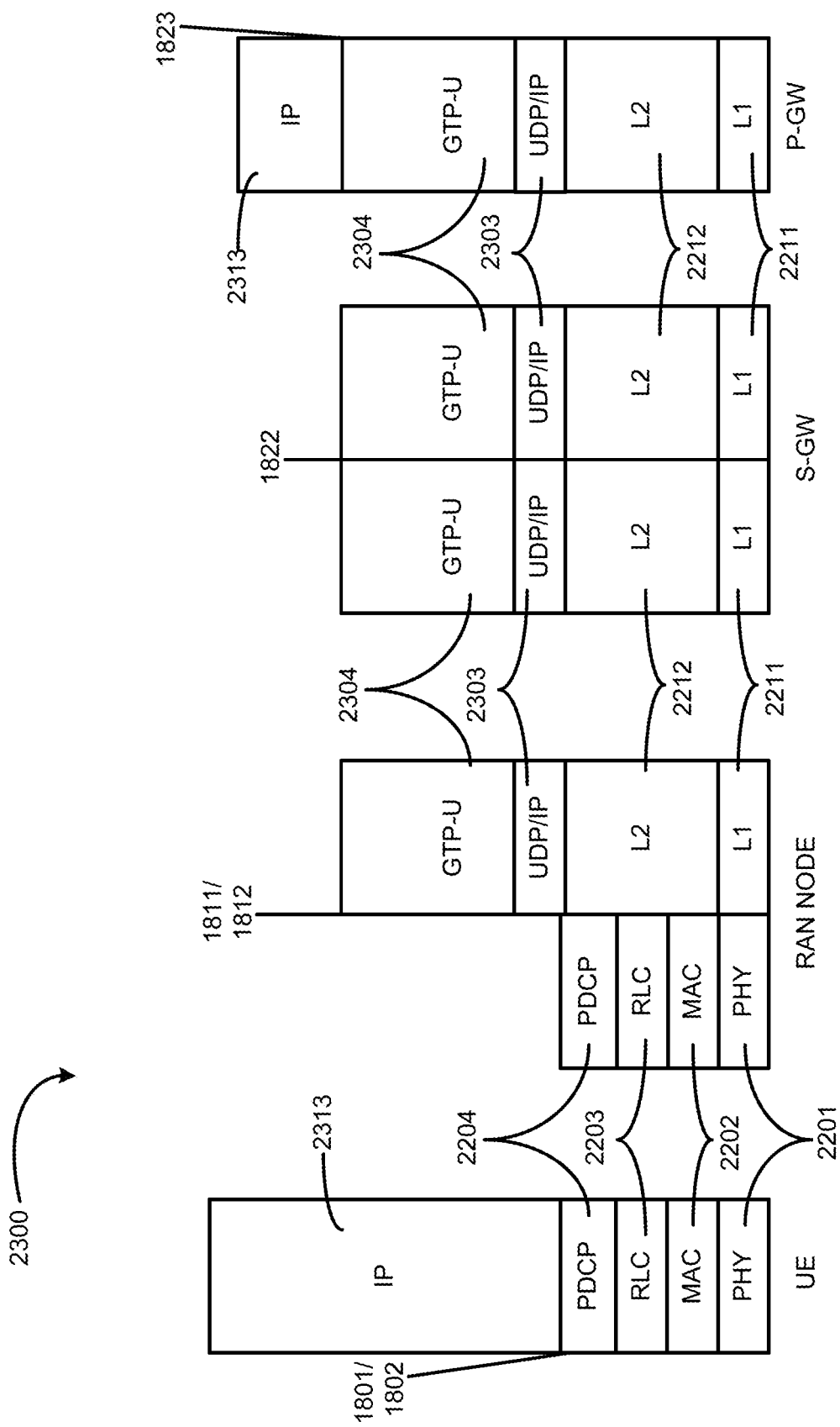
FIG. 23 is an illustration of a user plane protocol stack in accordance with some embodiments.

FIG. 23 is an illustration of a user plane protocol stack in accordance with some embodiments. In this embodiment, a user plane 2300 is shown as a communications protocol stack between the UE 1801 (or alternatively, the UE 1802), the RAN node 1811 (or alternatively, the RAN node 1812), the S-GW 1822, and the P-GW 1823. The user plane 2300 may utilize at least some of the same protocol layers as the control plane 2200. For example, the UE 1801 and the RAN node 1811 may utilize a Uu interface (e.g., an LTE-Uu interface) to exchange user plane data via a protocol stack comprising the PHY layer 2201, the MAC layer 2202, the RLC layer 2203, the PDCP layer 2204.

The General Packet Radio Service (GPRS) Tunneling Protocol for the user plane (GTP-U) layer 2304 may be used for carrying user data within the GPRS core network and between the radio access network and the core network. The user data transported can be packets in any of IPv4, IPv6, or PPP formats, for example. The UDP and IP security (UDP/IP) layer 2303 may provide checksums for data integrity, port numbers for addressing different functions at the source and destination, and encryption and authentication on the selected data flows. The RAN node 1811 and the S-GW 1822 may utilize an S1-U interface to exchange user plane data via a protocol stack comprising the L1 layer 2211, the L2 layer 2212, the UDP/IP layer 2303, and the GTP-U layer 2304. The S-GW 1822 and the P-GW 1823 may utilize an S5/S8 a interface to exchange user plane data via a protocol stack comprising the L1 layer 2211, the L2 layer 2212, the UDP/IP layer 2303, and the GTP-U layer 2304. As discussed above with respect to FIG. 22, NAS protocols support the mobility of the UE 1801 and the session management procedures to establish and maintain IP connectivity between the UE 1801 and the P-GW 1823.

Figure 24:
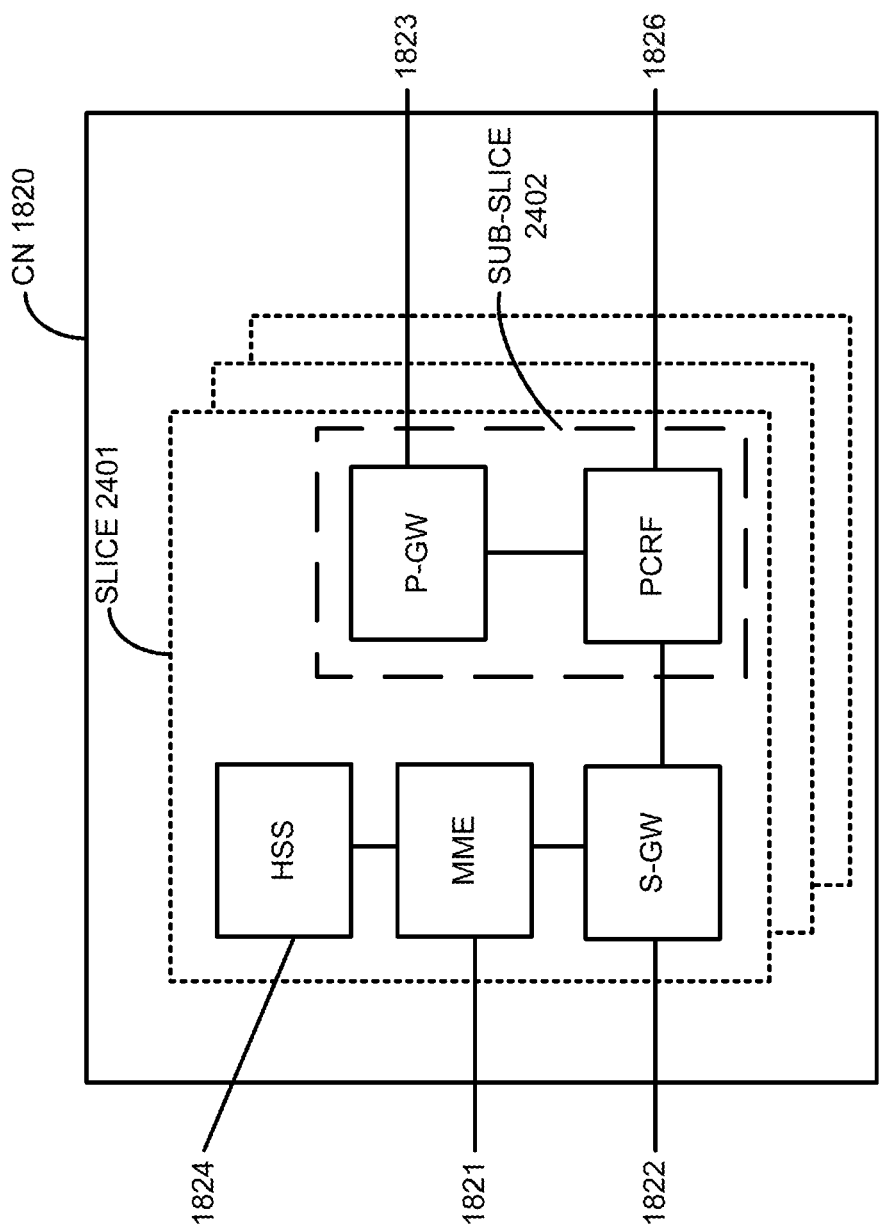
FIG. 24 illustrates components of a core network in accordance with some embodiments.

FIG. 24 illustrates components of a core network in accordance with some embodiments. The components of the CN 1820 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1820 may be referred to as a network slice 2401. A logical instantiation of a portion of the CN 1820 may be referred to as a network sub-slice 2402 (e.g., the network sub-slice 2402 is shown to include the PGW 1823 and the PCRF 1826).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 25:
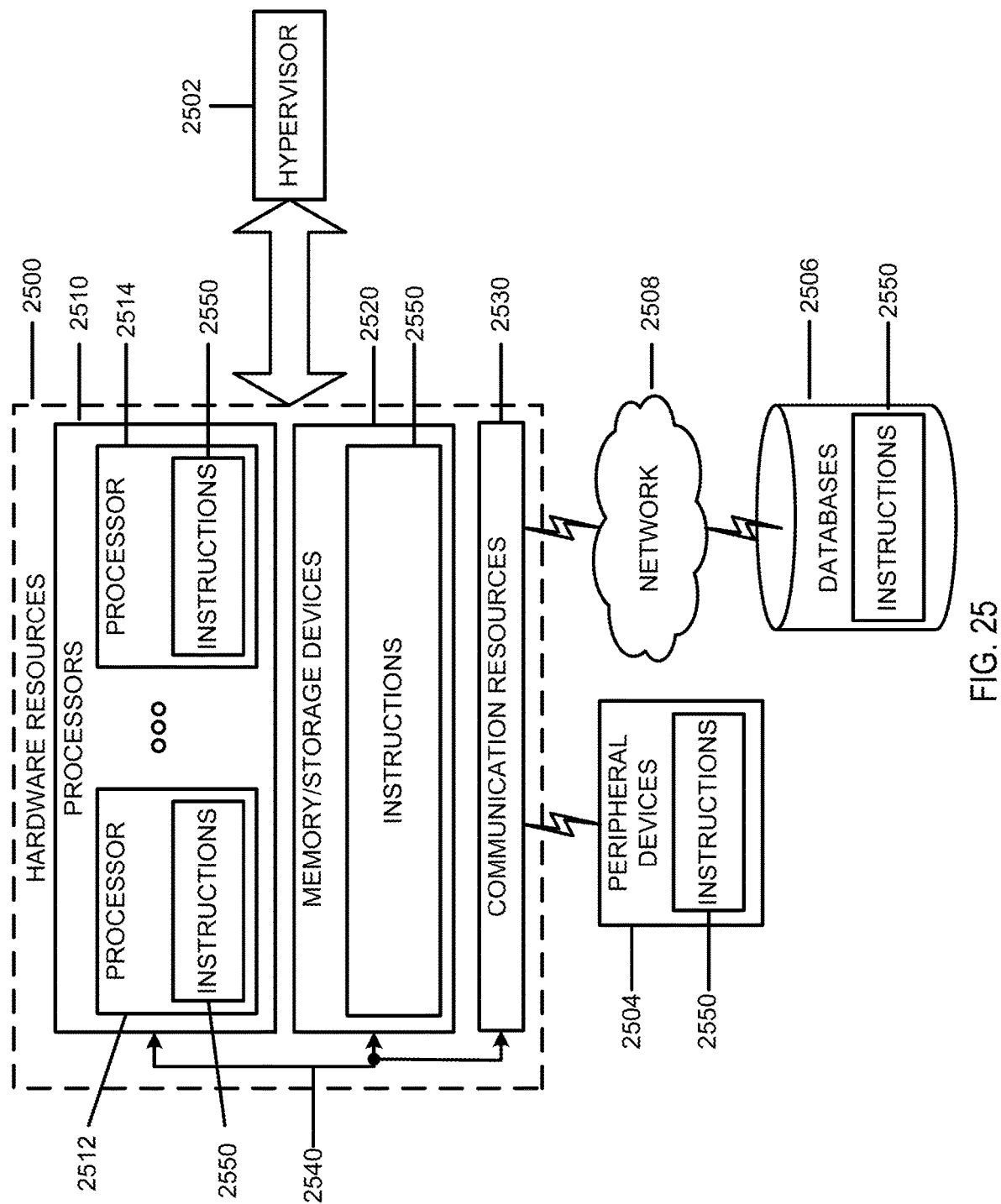
FIG. 25 is a block diagram illustrating components, according to some example embodiments.

FIG. 25 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 25 shows a diagrammatic representation of hardware resources 2500 including one or more processors (or processor cores) 2510, one or more memory/storage devices 2520, and one or more communication resources 2530, each of which may be communicatively coupled via a bus 2540. For embodiments where node virtualization (e.g., NFV) is utilized, a hypervisor 2502 may be executed to provide an execution environment for one or more network slices/sub-slices to utilize the hardware resources 2500.

The processors 2510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2512 and a processor 2514.

The memory/storage devices 2520 may include main memory, disk storage, or any suitable combination thereof. The memory/storage devices 2520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2530 may include interconnection or network interface components or other suitable devices to communicate with one or more peripheral devices 2504 or one or more databases 2506 via a network 2508. For example, the communication resources 2530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2550 may comprise software, a program, an application, an applet, an app, or other executable code for causing at least any of the processors 2510 to perform any one or more of the methodologies discussed herein. The instructions 2550 may reside, completely or partially, within at least one of the processors 2510 (e.g., within the processor's cache memory), the memory/storage devices 2520, or any suitable combination thereof. Furthermore, any portion of the instructions 2550 may be transferred to the hardware resources 2500 from any combination of the peripheral devices 2504 or the databases 2506. Accordingly, the memory of processors 2510, the memory/storage devices 2520, the peripheral devices 2504, and the databases 2506 are examples of computer-readable and machine-readable media.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus of a user equipment (UE), comprising:
one or more data storage devices to store available delay budget information (DBI) pertaining to end-to-end delivery of a real-time transport protocol (RTP) stream sent from a remote UE to the UE; and
one or more processors to:
based on radio access network (RAN) delay budget reporting and a determination of good radio conditions at the UE, reduce an air interface delay of the UE to receive the RTP stream from the remote UE;
in response to a reduction in the air interface delay of the UE, generate an application layer message including the available delay budget information for the remote UE, the application layer message to be transmitted to the remote UE; and
decode, during delivery of the RTP stream, a query message from the remote UE, the query message to request additional delay budget from the UE.

2. The apparatus of claim 1, wherein the application layer message comprises a real-time transport protocol (RTCP) feedback message including the delay budget information.

3. The apparatus of claim 1, wherein the application layer message is configured to indicate a relative additional delay value, a sign of the relative additional delay value, and a Boolean query parameter, which, if set to positive, allows requesting delay for a reverse RTP stream sent from the UE to the remote UE, the sign of the relative additional delay value indicating whether the relative additional delay value should be added to the delay budget or whether the delay budget should be reduced by the relative additional delay value.

4. The apparatus of claim 1, wherein the application layer message comprises an RTP header extension message including the delay budget information, which is sent as part of a reverse RTP stream from the UE to the remote UE.

5. The apparatus of claim 4, wherein the application layer message is configured to indicate a relative additional delay value, a sign of the relative additional delay value, and a Boolean query parameter, the Boolean query parameter being set to positive to enable requesting delay for a reverse RTP stream sent from the UE to the remote UE, the sign of the relative additional delay value indicating whether the relative additional delay value should be added to the delay budget or whether the delay budget should be reduced by the relative additional delay value.

6. The apparatus of claim 1, wherein the one or more processors are further configured to decode a session description protocol (SDP) answer message received from the remote UE, the SDP answer message including an extension map attribute that is associated with a standardized delay budget query parameter, the standardized delay budget query parameter configured to indicate that the remote UE supports the query message signalled via application layer messages.

7. The apparatus of claim 1, wherein the query message received from the remote UE includes a requested additional delay value and a sign of the additional delay value, the sign of the additional delay value indicating whether the additional delay value should be added to the delay budget or whether the delay budget should be reduced by the additional delay value.

8. The apparatus of claim 1, wherein the one or more processors are further configured to decode a session description protocol (SDP) offer message received from the remote UE, the SDP offer message configured to indicate that the remote UE supports reception of the delay budget information via application layer messages.

9. The apparatus of claim 1, wherein the one or more processors are further configured to generate a session description protocol (SDP) answer message to be transmitted to the remote UE, the SDP answer message configured to indicate that the UE supports transmission of the delay budget information via application layer messages.

10. The apparatus of claim 1, wherein the one or more processors are further configured to determine the delay budget information based on an assessment of how much additional delay the UE can tolerate based on end-to-end monitoring of network delay, jitter, packet loss ratio (PLR), and constraints for a jitter buffer manager of the UE.

11. The apparatus of claim 1, wherein the one or more processors are further configured to generate, responsive to detections of high end-to-end packet loss and good local radio conditions between the UE and a cellular base station servicing the UE, a request message to be transmitted to an evolved NodeB (eNB) servicing the UE, the request message configured to request that the cellular base station servicing the UE reduce an air interface delay associated with the delay budget information.

12. The apparatus of claim 11, wherein the delay budget information of the application layer message includes a relative additional delay value configured to indicate an air interface delay reduction achieved responsive to the cellular base station servicing the UE reducing the air interface delay.

13. An apparatus of a user equipment (UE), comprising:
one or more data storage devices to store available delay budget information pertaining to end-to-end delivery of a real-time transport protocol (RTP) stream from a remote UE to the UE; and
one or more processors to:
based on radio access network (RAN) delay budget reporting and a determination of good radio conditions at the UE, reduce an air interface delay of the UE to receive the RTP stream from the remote UE;
in response to a reduction in the air interface delay of the UE, generate an RTP header extension message including the delay budget information for the remote UE, the RTP header extension message to be transmitted to the remote UE; and
decode, during delivery of the real-time RTP steam, a query message from the remote UE, the query message to request additional delay budget from the UE.

14. The apparatus of claim 13, wherein the RTP header extension message is configured to indicate a relative additional delay value, a sign of the relative additional delay value, and a Boolean query parameter, which, if set to positive allows requesting delay for a reverse RTP stream sent from the UE to the remote UE, the sign of the relative additional delay value indicating whether the relative additional delay value should be added to the delay budget or whether the delay budget should be reduced by the relative additional delay value.

* * * * *